United States Patent [19]

Ganter

[11] Patent Number: 5,802,112
[45] Date of Patent: Sep. 1, 1998

[54] MULTI-LEVEL, MULTI-FREQUENCY INTERFERENCE PATTERN ANALOG WAVEFORM ENCODING OF DIGITAL DATA FOR TRANSMISSION

[75] Inventor: William A. Ganter, Boulder, Colo.

[73] Assignee: Transcendat Inc., Boulder, Colo.

[21] Appl. No.: 773,527

[22] Filed: Dec. 23, 1996

Related U.S. Application Data

[60] Provisional application No. 60/009,843 Jan. 16, 1996.
[51] Int. Cl.$^6$ .................. H04K 1/10; H04L 27/28
[52] U.S. Cl. .................. 375/260; 375/316; 379/383; 379/386
[58] Field of Search .................. 375/260, 316, 375/340; 379/283, 386; 341/147

[56] References Cited

U.S. PATENT DOCUMENTS

| | | | |
|---|---|---|---|
| 3,787,836 | 1/1974 | Hagelbarger | 340/347 |
| 3,941,942 | 3/1976 | Nash | 179/90 |
| 4,091,243 | 5/1978 | Mizrahi et al. | 179/84 |
| 4,142,184 | 2/1979 | Lake | 340/347 |
| 4,333,150 | 6/1982 | Matty et al. | 364/384 |
| 4,349,704 | 9/1982 | Gillis | 179/84 |
| 4,425,666 | 1/1984 | Groth . | |
| 4,601,045 | 7/1986 | Lubarsky . | |
| 4,639,554 | 1/1987 | Masuda et al. | 340/365 |
| 4,680,777 | 7/1987 | Saha . | |
| 4,726,040 | 2/1988 | Acampora | 375/75 |
| 4,727,570 | 2/1988 | Tarbouriech | 379/361 |
| 4,878,236 | 10/1989 | Ray et al. | 379/37 |
| 5,063,574 | 11/1991 | Moose . | |
| 5,335,250 | 8/1994 | Dent et al. | 375/10 |
| 5,402,449 | 3/1995 | Schultes et al. | 375/94 |
| 5,425,053 | 6/1995 | Matsumoto | 375/287 |
| 5,499,270 | 3/1996 | Popovici et al. | 375/272 |
| 5,557,645 | 9/1996 | Dent | 375/340 |
| 5,588,053 | 12/1996 | Xie | 379/386 |
| 5,659,606 | 8/1997 | Druilhe | 379/283 |

*Primary Examiner*—Stephen Chin
*Assistant Examiner*—Mohammad Ghayour
*Attorney, Agent, or Firm*—Frommer Lawrence & Haug LLP; William S. Frommer

[57] ABSTRACT

Digital data is encoded into a series of analog waveforms, called symbol waveforms, created as the result of interference of sinusoidal wave interference patterns. Each of these symbol waveforms is an encoded version of N-bits of data. These encoded symbol waveforms is an encoded version which are very different, in both appearance and in propagation properties, from traditional voltage state signaling or pulse codes. The encoded symbol waveforms are formed by generating and superimposing a set of analog sinusoidal waves, where the gain and phase shift of each wave is computed so as to provide, in combination, a unique interference pattern that can be recognized, via signal processing techniques, by a detector and then decoded. The symbol waveforms are computed so that successive symbol waveforms seam together to form a smooth continuous AC analog signal that does not itself generate interference frequencies, can be bandpass filtered, and is suitable for long distance propagation. The transmission technology of the present invention is applicable to, inter alia, a digital communications device or system.

44 Claims, 10 Drawing Sheets

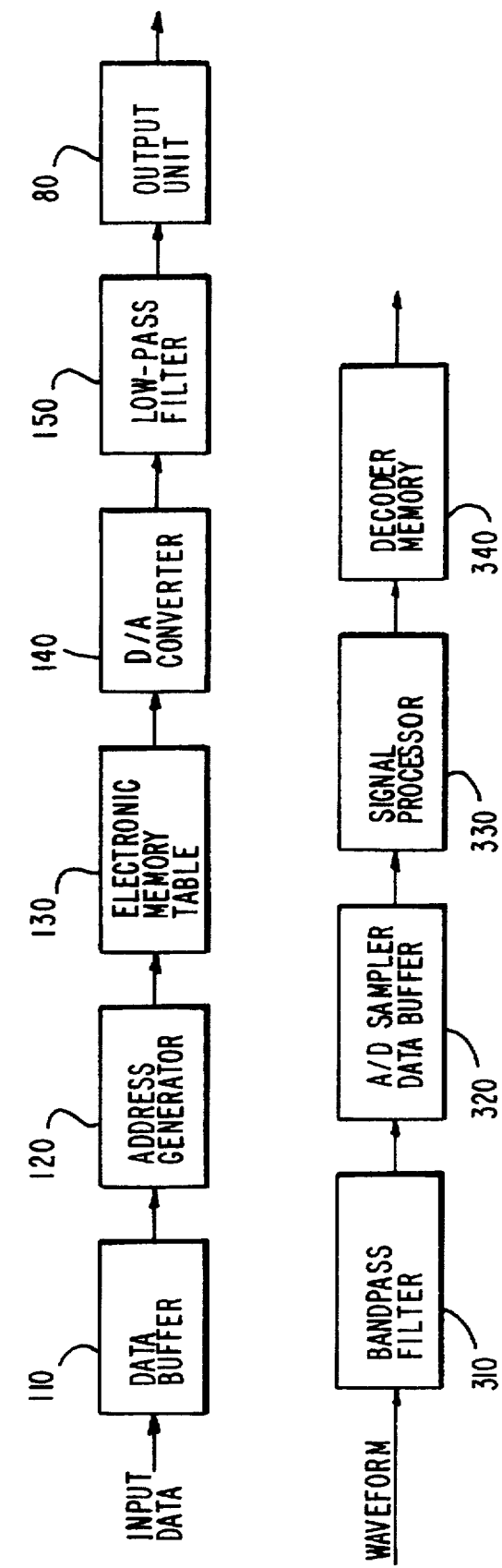

MULTI-LEVEL, MULTI-FREQUENCY INTERFERENCE PATTERN ANALOG WAVEFORM ENCODING OF DIGITAL DATA FOR TRANSMISSION

This is a continuation of a provisional application serial number 60/009,843 filed Jan. 16, 1996.

BACKGROUND OF THE INVENTION

The present invention relates to a data encoding method and apparatus capable of encoding digital data into a smooth analog waveform.

FIG. 1 illustrates the pulse code modulation (PCM) in a 100 Mbps Ethernet wire LAN, defined within the IEEE Standard 802 series. PCM is widely used in connecting distributed computers to servers and in other computer networks, such as Intranets. However, this technology is limited by specification to 328 feet of propagation. Further, the voltage state changes produce many unwanted frequencies that interfere with the data transmission and complicate data detection by a detector. For example, a voltage swing of one volt within a few nanoseconds results in the ringing shown in FIG. 1.

It has been proposed that a plurality of N selected sinusoidal waves of N frequencies be set to particular gain levels and particular phase shifts to form a code set (symbol). The code set is detected by a detector which performs a discrete Fourier transform (DFT) computation on the detected symbol at each of the N frequencies to recover each of the N gain and N phase shift settings that were in effect during that symbol interval. Each of the N waves is treated as a separate subcarrier and the bandwidth spans the full range of the N frequencies used. Due to the computational complexity and discontinuities of N waves at each symbol boundary, the symbol must be held for a sufficiently long symbol duration (interval) for the detector to identify and decode the received symbol. However, such long symbol interval leads to low data transmission rates and may explain why this method is not utilized in currently available data transmission devices.

Instead of performing complex calculations to decode data from multiple waves, it is desirable to select a set of sinusoidal waves exhibiting controllable characteristics such that the resulting interference pattern arising from combining, or superimposing, these waves can be detected (decoded) as a unique code symbol (data) to provide high speed communication of information, particularly digital information, across large distances.

OBJECTS OF THE INVENTION

Therefore, it is an object of the present invention to provide a technique of encoding and transmitting data at a high rate, particularly digital data, over long distances.

Another object of this invention is to provide an encoding method and apparatus which controls the frequency content of the waveform that is used to transmit the encoded data.

A further object of this invention is to provide an apparatus and technique as aforesaid, wherein the AC analog waveform that transmits the encoded data is within a narrow bandwidth such that it can be bandpass filtered to remove out-of-band noise, thereby enabling independent transmission channels to be closely spaced for efficient spectrum utilization.

An additional object of this invention is to provide an apparatus and technique as aforesaid for encoding data with a high encoding efficiency.

Various other objects, advantages and features of the present invention will become readily apparent from the ensuing detailed description, and the novel features will be particularly pointed out in the appended claims.

SUMMARY OF THE INVENTION

In accordance with this invention, an encoding method is provided for encoding input data into a plurality of analog waves which are combined to produce a unique interference pattern representing the input data. A plurality of analog waves of selected frequencies is generated, each exhibiting a phase- and gain-controlled in accordance with the input data. The phase- and gain-controlled waves are combined to create a unique interference pattern that appears as a single AC analog waveform.

Preferably, the input data is divided into data segments of N-bits and the N-bit data segment is encoded into a plurality of phase- and gain-controlled analog waves.

In a preferred embodiment, encoding and decoding apparatus are incorporated in transmitter and receiver, respectively, to permit communication of information across large distances. Also, the encoding and decoding apparatus may be incorporated in a regenerative repeater to assist in the transmission of information without deterioration.

BRIEF DESCRIPTION OF THE DRAWINGS

The following detailed description, given by way of example, and not intended to limit the present invention solely thereto, will best be understood in conjunction with the accompanying drawings in which:

FIG. 10 is a block diagram showing W separate frequency synthesizers incorporated in the encoding apparatus of FIG. 9; and FIG. 11 is a block diagram of the generalized A/D sampling and signal processing apparatus of the present invention, for detection and decoding of the received AC analog waveform.

DETAILED DESCRIPTION OF THE PREFERRED EMBODIMENTS

Figure 2:
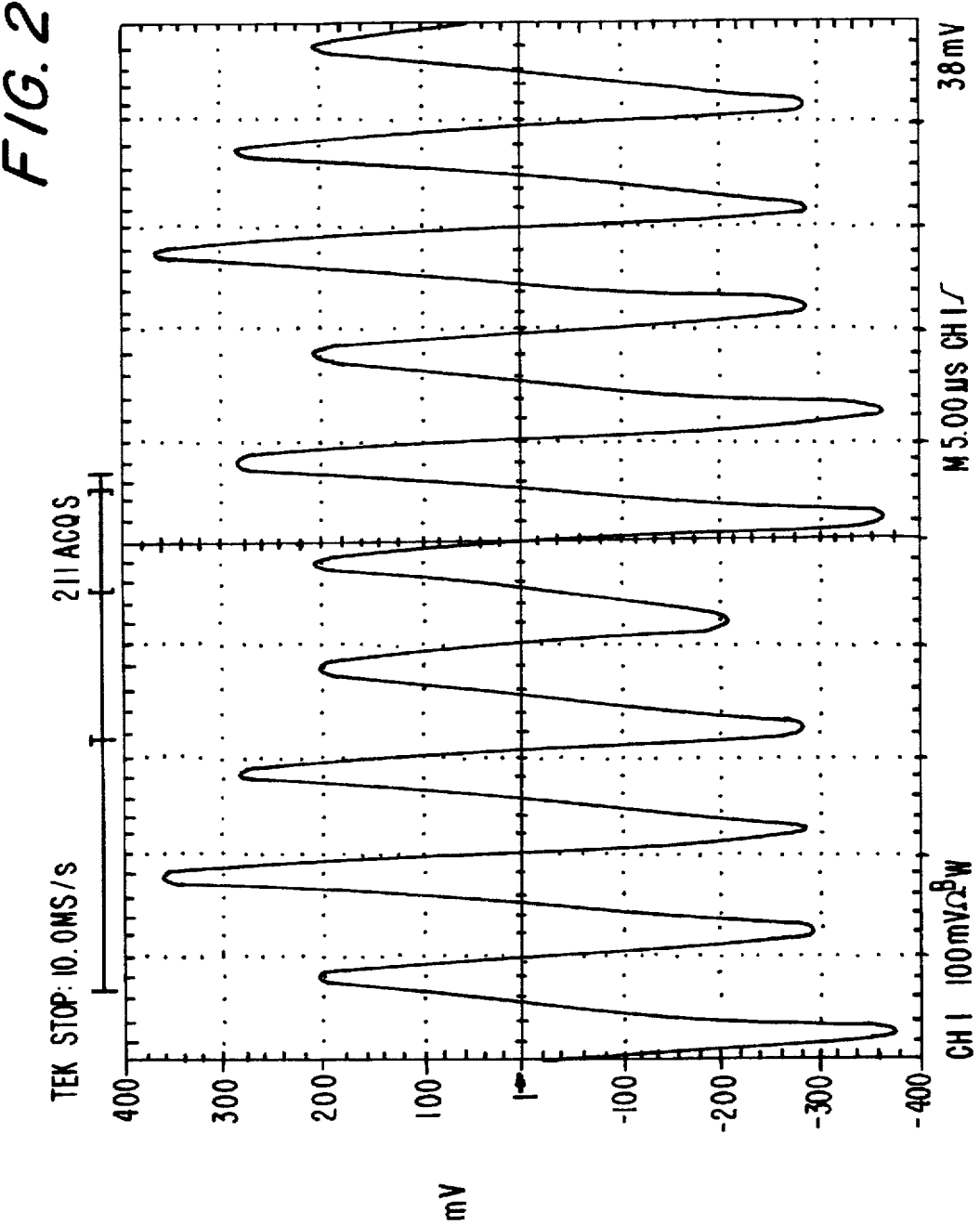
FIG. 2 is an actual A/D sampling of a 200 KHz waveform transmission of the present invention.

The transmission apparatus of the present invention propagates a smooth analog AC waveform directly in either wire or air, or alternatively this waveform modulates a carrier wave which is then propagated. The waveform is made up of a sequence of symbols that are seamed together at the symbol boundaries. The voltage level of the waveform at the symbol boundaries is zero so that symbols can be seamed together without significant discontinuity. FIG. 2 shows a smooth AC analog waveform in accordance with this invention having a frequency of 200 KHz. Waveforms in accordance with this invention can propagate several thousands of feet in wire, supporting data rates of several hundred Mbps. Its data rates are limited only by the maximum clock rates of present integrated circuit (IC) technology, rather than by noise. Alternatively, the AC analog waveform in accordance with this invention may modulate an RF carrier wave. In other application of the present invention, such as in a narrow bandwidth application, the AC analog waveform generated in accordance with this invention offers a high spectral utilization resulting from closely spaced non-interfering carrier waves or from closely spaced non-interfering directly propagating waveforms. In addition, the carrier-to-noise ratio of this invention, in order to support a given bit error rate, is very favorable due to its narrow bandwidth, which allows out-of-band noise to be filtered out.

Each symbol encodes N bits of digital data. Each symbol is constructed by superimposing a plurality of W sinusoidal waves to form a unique and recognizable interference pattern. $2^N$ different interference patterns (symbols) are needed to code N bits of data for transmission, however, E extra or additional symbols can be assigned to transmission control purposes, thereby requiring a total of $M=(2^N+E)$ unique symbols. In other words, the maximum number of data bits that can be encoded per symbol is $N \leq \log_2 M$.

Several variables, needed to code and generate the symbol waveforms, and needed to detect and decode these symbol waveforms, are computed. Preferably, these computed variables are designed into the custom integrated circuits (IC's) that implement the transmission technology of the present invention.

In each different application of the present invention, the variables are optimized, through the computation discussed below, for its particular operating environment. For each application of the invention, multiple combinations of the variables are available, but the optimal selection of these variables may be limited by a series of tradeoffs, such as cost and various performance requirements of that particular application.

Each symbol spans predetermined timing intervals, referred to as cells, where each cell represents a predetermined time duration L seconds. The polarity of the AC analog waveform which represents the symbols alternates by cell, that is, it is opposite in adjacent cells.

Let it be assumed that W substantially pure sinusoidal waves are superimposed to create the interference pattern constituted by a symbol waveform, so that the symbol waveform can be represented by s(t):

$$s(t) = \sum_{x \in W} g_x \sin\left[\left(\frac{xt}{KL} + p_x\right)\pi\right] \quad (1)$$

where t ranges from 0 to KL seconds (defining the outer boundaries of a symbol), K is equal to the span or number of cells, and $g_x$ and $p_x$ denote the gain and phase of the x wave. Here, the frequency of the x wave is given by $f_x=x/2KL$ Hz. Some of the W waves must have frequency less than $f_K=K/(2KL)=1/2L$ Hz and some waves must have frequency greater than $f_K$. In order to create a smooth nearly continuous waveform, the equation s(t) is constrained to zero at all of the symbol boundaries, i.e., s(0)=s(KL)=0 mV. In other words, the gain and/or phase of each wave are controlled so that the signal level of the symbol waveform s(t) is substantially zero at all of the symbol boundaries. It is appreciated that the frequencies of the superimposed waves are not necessarily limited to integer multiples of 1/2KL, but can be non-integer multiples of 1/2KL, e.g., $f_{1.8}=1.8/2KL$.

If all the constituent waves are in-phase at t=0, equation (1) reduces to the following:

$$s(t) = \sum_{x \in W} g_x \sin\left(\frac{xt\pi}{KL}\right). \quad (2)$$

Figure 3:
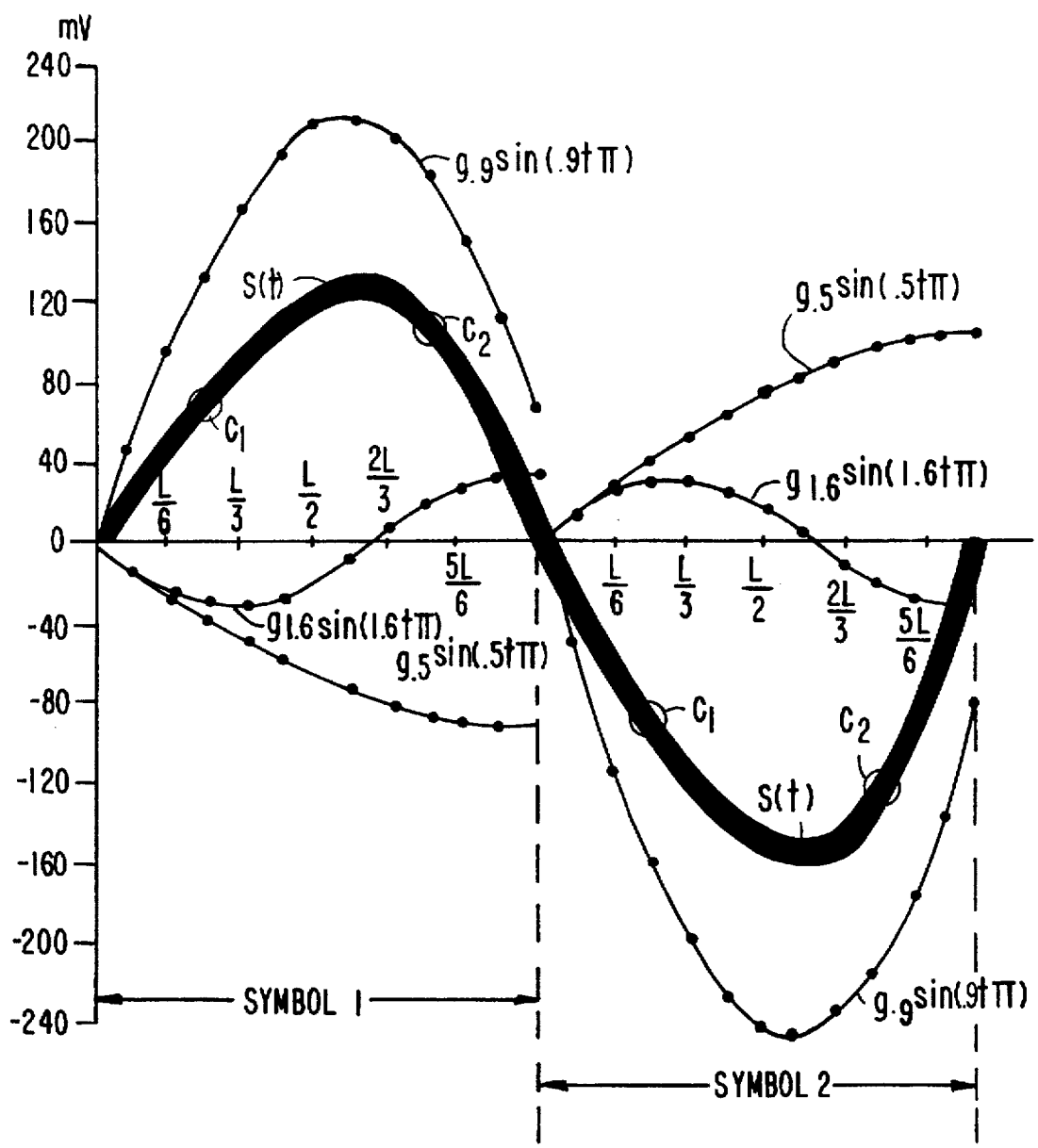
FIG. 3 is a graph of two symbols generated by an embodiment of the present invention using W=3 sinusoidal waves which are shown together with the resulting interference pattern which is shown as a continuous AC analog waveform.

The manner in which the gains are calculated for each constituent wave of the symbol waveform s(t) to be transmitted will now be explained in conjunction with FIG. 3. FIG. 3 illustrates two symbol waveforms s(t) representing two symbols seamed together to form an AC analog waveform. In this example, one symbol spans only a single cell (K=1 cell span) and three waves in-phase at t=0 are used to create the interference pattern represented by the symbol waveform s(t). The frequencies of these three waves are $f_{0.5}=0.5/2L$ Hz
$f_{0.9}=0.9/2L$ Hz
$f_{1.6}=1.6/2L$ Hz.

It is appreciated that the selection of the frequency of each wave is nearly arbitrary, requiring only that the resulting symbol waveform s(t) is substantially zero at the symbol boundaries (or at the cell boundaries for K=1) and that the frequencies of some of the waves are less than $f_1=1/2L$ and some are greater than $f_1$.

Since the symbol waveform s(t) for every symbol is generated with zero voltage at the symbol end points (boundaries), i.e., s(0)=0 and s(1L)=0, so that symbols can be seamed together without significant discontinuity to form the AC analog waveform. The in-phase condition at t=0 always results in s(0)=0 because sin (0)=0. Hence, a set of three independent linear equations can be derived from equation (2), wherein the amplitude of the symbol waveform s(t) is constrained to $C_1$ mV at t=0.25L and $C_2$ mV at t=0.75L:

$$s(0.25L) = C_1 = g_{0.5} \sin.125\pi + g_{0.9} \sin.225\pi + g_{1.6} \sin 0.4\pi \quad (3)$$

$$s(0.75L) = C_2 = g_{0.5} \sin.375\pi + g_{0.9} \sin.675\pi + g_{1.6} \sin 1.2\pi \quad (4)$$

$$s(1L) = 0 = g_{0.5} \sin.5\pi + g_{0.9} \sin.9\pi + g_{1.6} \sin 1.6\pi, \quad (5)$$

where $g_x$ represents the gain of the constituent wave having the frequency $f_x$. By substitution, the equations (3)–(5) lead to the following solution for $g_{0.5}$, $g_{0.9}$ and $g_{1.6}$:

$$g_{1.6} = 1.0514 * g_{0.5} + 0.3249 * g_{0.9}$$

$$g_{0.5} = 1.0644 * C_1 - 1.5418 * C_2$$

$$g_{0.9} = 2.2244 * C_2 - 0.4921 * C_1.$$

As a numerical example if four possible values (amplitude levels) are selected for $C_1$ and for $C_2$, namely 70 mV, 90 mV, 110 mV and 130 mV, then M=16 unique interference patterns can be generated, in this example, with each of the 16 interference patterns representing a unique symbol. From the expression $N \leq \log_2 M$, the maximum number of data bits that can be encoded per symbol is N=4 in this example and the data rate is defined in general by $D=N/KL$. Since $M=2^N$, there are no extra symbols in this example, so that $E=0$. Although the number of constraints, i.e., $C_1$ and $C_2$, is shown to be equal to two per cell, it is appreciated that the number of constraints per cell can be any number greater than or equal to one.

In FIG. 3, $C_1=70$ mV and $C_2=110$ mV for the first symbol and $C_1=90$ mV and $C_2=-130$ mV for the second symbol. It is appreciated that since the polarity of the symbol waveform $s(t)$ is opposite in adjacent cells, when K is odd, the polarity of the amplitude of $s(t)$ i.e., $C_1$ and $C_2$, alternates with each symbol to maintain a continuous analog waveform in accordance with this invention.

Tables 1.1 and 1.2 contain the amplitude values (in voltage) of the symbol waveform $s(t)$ in FIG. 3 sampled at $P=12$ equally space points per cell $$0, \frac{L}{12}, \frac{L}{6}, \frac{L}{4}, \frac{L}{3} \cdots \frac{11L}{12}$$

and the end point L which corresponds to the starting point $t=0$ of the subsequent symbol. The corresponding amplitude values of each of the three constituent waves at the same twelve sample points per cell derived from equations (3)–(5) are also included in FIG. 3 to graphically show the interference patterns being reinforced and canceled by the constituent waves. Table 1.1 and 1.2 also list the gains $g_x$ computed for the first and second symbols, respectively, shown in FIG. 3 where $s_{0.5}(t)=g_{0.5} \sin 0.5\pi t$, $s_{0.9}(t)=g_{0.9} \sin 0.9\pi t$ and $s_{1.6}(t)=g_{1.6} \sin 1.6\pi t$ and $s(t)=s_{0.5}(t)+s_{0.9}(t)+s_{1.6}(t)$. As shown graphically in FIG. 3 and tabulated in Tables 1.1 and 1.2, the constituent waves exhibit a discontinuity at the symbol boundary, but in accordance with the invention, the AC analog waveform is continuous at the symbol boundary. That is, the symbol waveforms representing the first and second symbols are equal to zero at $t=0$ and $t=L$, but the amplitude of the constituent waves at $t=L$ is not equal to zero, i.e., the last row in table 1.1 shows that $s_{0.5}(L)=-95.1$ mV, $s_{0.9}(L)=65.0$ and $s_{1.6}(L)=30.1$ mV.

TABLE 1.1

FIRST SYMBOL CONSTRAINT: $C_1 = 70$ mV and $C_2 = 110$ mV
gain variables: $g_5 = -95.09$ $g_9 = 210.24$ $g_{1.6} = -31.67$

| t/L | s(t) | $s_{.5}$(t) | $s_{.9}$(t) | $s_{1.6}$(t) |
|---|---|---|---|---|
| 0.000 | 0.0 | 0.0 | 0.0 | 0.0 |
| 0.083 | 23.8 | -12.4 | 49.1 | -12.9 |
| 0.167 | 47.3 | -24.6 | 95.4 | -23.5 |
| 0.250 | 70.0 | -36.4 | 136.5 | -30.1 |
| 0.333 | 91.0 | -47.5 | 170.1 | -31.5 |
| 0.417 | 108.9 | -57.9 | 194.2 | -27.4 |
| 0.500 | 121.8 | -67.2 | 207.6 | -18.6 |
| 0.583 | 127.6 | -75.4 | 209.6 | -6.6 |
| 0.667 | 124.2 | -82.4 | 199.9 | 6.6 |
| 0.750 | 110.0 | -87.9 | 179.3 | 18.6 |
| 0.833 | 84.2 | -91.8 | 148.7 | 27.4 |
| 0.917 | 47.1 | -94.3 | 109.8 | 31.5 |
| 1.000 | 0.0 | -95.1 | 65.0 | 30.1 |

TABLE 1.2

SECOND SYMBOL CONSTRAINT: $C_1 = -90$ mV and $C_2 = 130$ mV
gain variables: $g_5 = -104.64$ $g_9 = 244.88$ $g_{1.6} = 30.45$

| t/L | s(t) | $s_{.5}$(t) | $s_{.9}$(t) | $s_{1.6}$(t) |
|---|---|---|---|---|
| 0.000 | 0.0 | 0.0 | 0.0 | 0.0 |
| 0.083 | -31.1 | 13.7 | -57.2 | 12.4 |

TABLE 1.2-continued

SECOND SYMBOL CONSTRAINT: $C_1 = -90$ mV and $C_2 = 130$ mV
gain variables: $g_5 = -104.64$ $g_9 = 244.88$ $g_{1.6} = 30.45$

| t/L | s(t) | $s_{.5}$(t) | $s_{.9}$(t) | $s_{1.6}$(t) |
|---|---|---|---|---|
| 0.167 | -61.5 | 27.1 | -111.2 | 22.6 |
| 0.250 | -90.0 | 40.0 | -159.0 | 29.0 |
| 0.333 | -115.5 | 52.3 | -198.1 | 30.3 |
| 0.417 | -136.2 | 63.7 | -226.2 | 26.4 |
| 0.500 | -150.0 | 74.0 | -241.9 | 17.9 |
| 0.583 | -154.8 | 83.0 | -244.1 | 6.3 |
| 0.667 | -148.6 | 90.6 | -232.9 | -6.3 |
| 0.750 | -130.0 | 96.7 | -208.8 | -17.9 |
| 0.833 | -98.5 | 101.1 | -173.2 | -26.4 |
| 0.917 | -54.5 | 103.7 | -128.0 | -30.3 |
| 1.000 | 0.0 | 104.6 | -75.7 | -29.0 |

In FIG. 3, the data transmission rate is $D=4/L$ bps. It is appreciated that selections of the number of cells per symbol (K), the number of constituent waves (W), and the frequency and phase of each constituent wave may be selected by the user. The selection of these parameters depends on a particular application of the present invention, such as whether the defined number of symbols is sufficiently unique to be individually recognized by a detector, at a low error probability.

Figure 4:
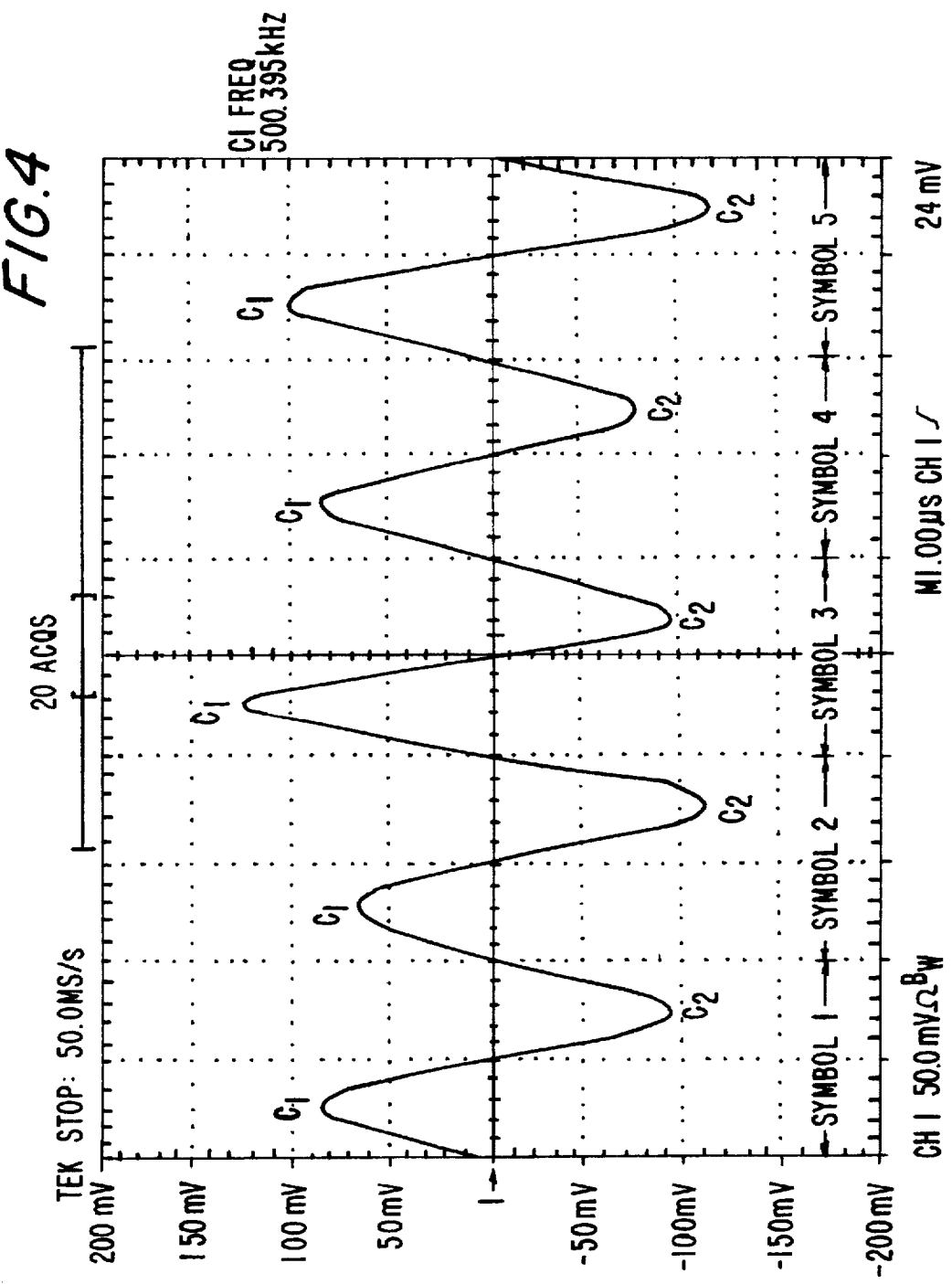
FIG. 4 is an actual A/D sampling of the symbol waveforms s(t) generated and transmitted by another embodiment of the present invention.

As another example, FIG. 4 is a received AC analog waveform formed from five symbol waveforms $s(t)$ representing five successive symbols. Each symbol waveform is the interference pattern formed from three sinusoidal waves having a narrow band of frequencies $f_{1.8}$, $f_2$ and $f_{2.2}$. In this example, one symbol spans two cells, i.e. $K=2$ cell span, and three sinusoidal waves in-phase at $t=0$ are used to form the interference pattern (i.e. $s(0)=0$).

Since the symbol waveform $s(t)$ for every symbol is generated with zero voltage at the symbol end points, i.e. $s(2L)=0$, so that the symbol waveforms $s(t)$ representing successive symbols can be seamed together without significant discontinuity to form the AC analog waveform, a set of four equations can be derived from equation (2) if the amplitude of the symbol waveform $s(t)$ is constrained to $C_1$ mV at $t=0.5L$, 0 mV at $t=L$ and $C_2$ mV at $t=1.5L$:

$$s(0.5L)=C_1=g_{1.8} \sin 0.9\pi+g_2 \sin \pi+g_{2.2} \sin 1.1\pi \quad (6)$$

$$s(1L)=0=g_{1.8} \sin 1.8\pi+g_2 \sin 2\pi+g_{2.2} \sin 2.2\pi \quad (7)$$

$$s(1.5L)=C_2=g_{1.8} \sin 2.7\pi+g_2 \sin 3\pi+g_{2.2} \sin 3.3\pi \quad (8)$$

$$s(2L)=0=g_{1.8} \sin 3.6\pi+g_2 \sin 4\pi+g_{2.2} \sin 4.4\pi, \quad (9)$$

where $g_x$ represents the gain of a constituent wave having frequency $f_x$.

Equations (7) and (9) are dependent equations and provide the following equality: $g_{2.2}=g_{1.8}$. As in the previous example, there are now $I=3$ independent linear equations, i.e., equations (6)–(8) or (6), (8) and (9), leading to the following solution for $I=3$ wave variables $g_{1.8}$, $g_2$ and $g_{2.2}$:

$$g_2=-9.2147*C_1-10.2147*C_2$$

$$g_{1.8}=g_{2.2}=-0.5611*(C_2+g_2)$$

As a numerical example, if four possible values (amplitude levels) are selected for $C_1$, namely 70 mV, 90 mV, 110 mV and 130 mV and five possible amplitude levels for $C_2$, namely 20 mV, 90 mV, 110 mV, 130 mV and 150 mV, then M=4*5=20 unique interference patterns can be generated, with each of the 20 interference patterns representing a unique symbol, and N=4 data bits can be encoded in this example, thus leaving E=M−2$^N$=4 symbols as extra symbols. FIG. 4 illustrates an actual A/D sampling of the analog waveform where L=1 μsec and D=2 Mbps.

FIG. 4 is the received analog waveform, including the systematic transmission effects such as filtering, transmission attenuation, etc., generated from five seamed together symbols. These waveforms were generated and seamed together to form the analog waveform where $C_1$=90 mV and $C_2$=−90 mV for the first symbol, $C_1$=70 mV and $C_2$=−110 for the second symbol, $C_1$=130 mV and $C_2$=−90 mV for the third symbol, $C_1$=90 mV and $C_2$=−70 mV for the fourth symbol, and $C_1$=110 mV and $C_2$=110 mV for the fifth symbol. It is appreciated that since the polarity of the analog waveform is opposite in adjacent cells, when K is even, every $C_1$ is positive and every $C_2$ is negative.

Figure 5:
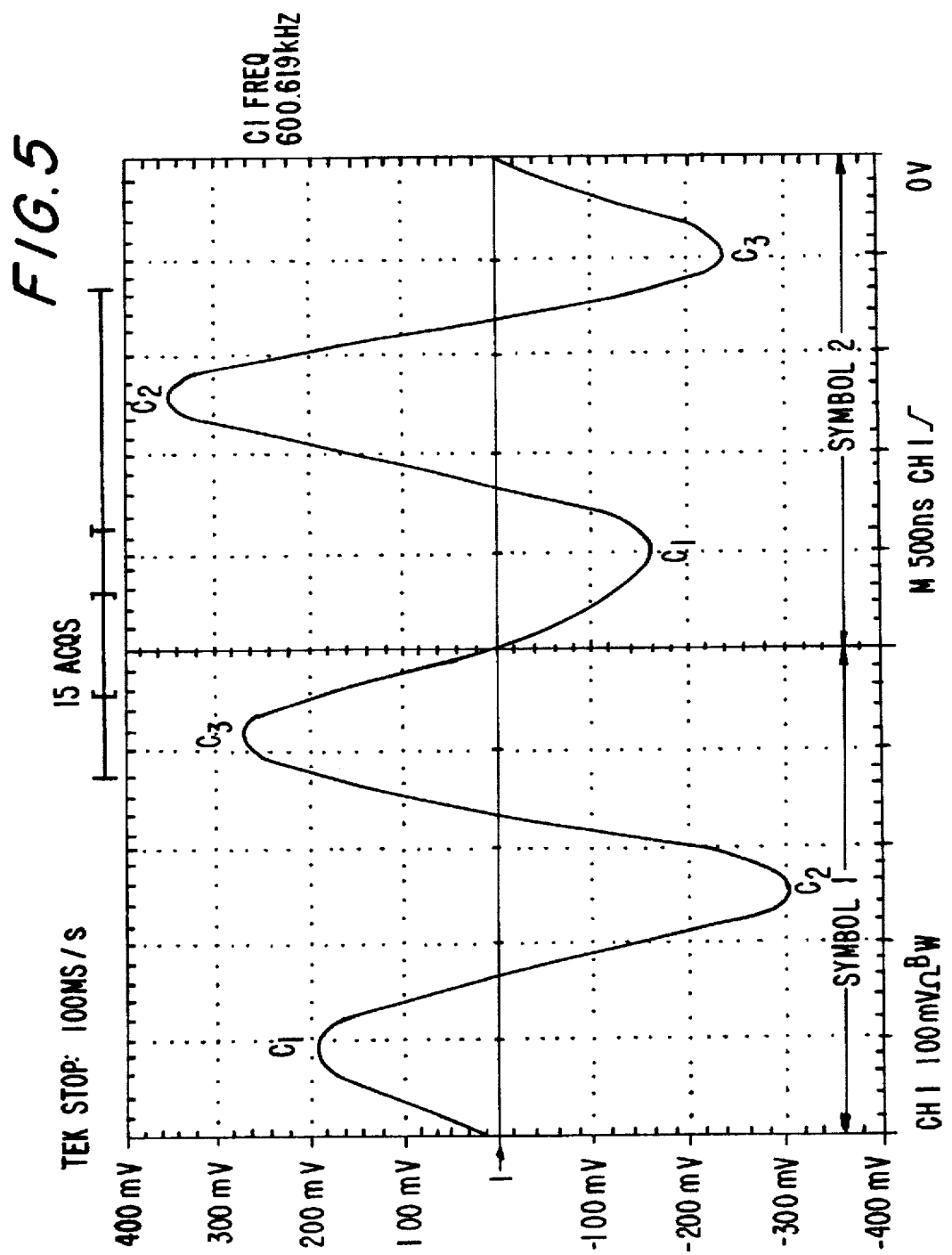
FIG. 5 is an actual A/D sampling of the symbol waveforms s(t) generated and transmitted by yet another embodiment of the present invention.

The manner in which phases are calculated for the constituent waves of the symbol waveform s(t) will now be explained in conjunction with FIG. 5. FIG. 5 is the received analog waveform, including systematic transmission effects, of two symbol waveforms s(t) representing two symbols. It is formed from three sinusoidal waves having frequencies $f_1$, $f_3$ and $f_5$. These three waves are not necessarily in-phase at t=0. In this example, each symbol spans three cells, i.e. K=3 cell span, and only one of the three constituent waves, namely the wave having frequency $f_3$ (or the $f_3$ wave) is in-phase at t=0, i.e., $p_3$=0. That is, the amplitude of the $f_3$ wave is zero at t=0. The phase of the $f_1$ wave and the phase of the $f_5$ wave are shifted by $p_1$ and $p_5$, respectively, at t=0. Since the constituent waves are not all in-phase at t=0, the simplified equation (2) cannot be used to solve for $g_x$ and equation (1) must be used.

Five equations can be derived from equation (1) by arbitrarily constraining the amplitude of the symbol waveform s(t) to $C_1$ mV at t=0.5L, $C_2$ mV at t=1.5L, $C_3$ mV at t=2.5L and 0 mV at the interior cell boundaries, i.e., at t=1L and t=2L:

$$s(0.5L)=C_1=g_1 \sin(0.167+p_1)\pi + g_3 \sin(0.833+p_5)\pi \quad (10)$$

$$s(1L)=0=g_1 \sin(0.333+p_1)\pi + g_3 \sin \pi + g_5 \sin(1.667+p_5)\pi \quad (11)$$

$$s(1.5L)=C_2=g_1 \sin(0.5+p_1)\pi + g_3 \sin 1.5\pi + g_5 \sin(2.5+p_5)\pi \quad (12)$$

$$s(2L)=0=g_1 \sin(0.667+p_1)\pi + g_3 \sin 2\pi + g_5 \sin(3.33+p_5)\pi \quad (13)$$

$$s(2.5L)=C_3=g_1 \sin(0.833+p_1)\pi + g_3 \sin 2.5\pi + g_5 \sin(4.167+p_5)\pi, \quad (14)$$

where $g_x$ and $p_x$ represent the gain and phase shift of the constituent wave having the frequency $f_x$. Two additional equations can be derived from equation (1) because the symbol waveform s(t) must also satisfy the zero voltage conditions at the symbol boundaries, i.e., s(0)=0 mV and s(3L)=0 mV:

$$s(0)=0=g_1 \sin p_1\pi + g_3 \sin 0 + g_5 \sin p_5\pi \quad (15)$$

$$s(3L)=0=g_1 \sin(1+p_1)\pi + g_3 \sin 3\pi + g_5 \sin(5+p_5)\pi. \quad (16)$$

The four zero voltage conditions, s(0)=s(1L)=s(2L)=s(3L)=0, are trigonometric identities that require $g_1$=−$g_5$ and $p_1$=1−$p_5$. Thus, there are five independent equations, i.e., $g_1$=−$g_5$, $p_1$=1−$p_5$ and equations (10), (12) and (14) that must be solved, but these equations are not linear equations as in the previous examples.

A solution exists when $g_3$=($C_1$−$C_2$+$C_3$)/3 as the average voltage level of s(t) in the center of each of the 3 cells. As previously described, the polarity of the symbol waveform alternates at every cell wherein in this example, $C_1$ is positive, $C_2$ is negative etc. But to solve for $g_1$, $p_1$ is iterated from 0 to 1 until $g_1$ simultaneously satisfies the following three equations:

$$g_1 = \frac{C_1 - g_3}{2\sin\left(\frac{.5\pi}{3} + p_1\pi\right)},$$

$$g_1 = \frac{g_3 + C_2}{2\sin\left(\frac{1.5\pi}{3} + p_1\pi\right)}, \text{ and}$$

$$g_1 = \frac{C_3 - g_3}{2\sin\left(\frac{2.5\pi}{3} + p_1\pi\right)}.$$

As a numerical example, if the same six possible values are selected for $C_1$, $C_2$ and $C_3$, namely 160 mV, 200 mV, 240 mV, 280 mV, 320 mV and 380 mV, then M=6*6*6=216 unique symbols can be generated. From the expression N≤log$_2$ M, the maximum number of data bits that can be encoded per symbol is N=7, thus leaving E=M−2$^N$=88 symbols as extra symbols. FIG. 5 illustrates an actual A/D sampling of the analog waveform where L=5/6 μsec and D=2.8 Mbps.

In FIG. 5, the received analog waveform of two symbol waveforms s(t), representing two symbols, is seamed together to form the analog waveform where $C_1$=200 mV, $C_2$=−320 mV and $C_3$=280 mV for the first symbol and $C_1$=−160 mV, $C_2$=360 mV and $C_3$=−240 mV for the second symbol. The above selected values for $C_1$, $C_2$ and $C_3$ leads to the following solutions for the first symbol:

$g_1$=−35.28 mV, $g_3$=266.67 mV, $g_5$=35.28 mV, $p_1$=0.2272, $p_5$=0.7728, and the following solutions for the second symbol:

$g_1$=58.12 mV, $g_3$=−253.33 mV, $g_5$=−58.12 mV, $p_1$=0.1301, $p_5$=0.8699.

Tables 2.1 and 2.2 contain the amplitude values (in voltage) of the symbol waveforms s(t) in FIG. 5 sampled at P=8 sample points per cell for a total of twenty-four points per symbol $$0, \frac{L}{8}, \frac{3L}{8}, \ldots L, \frac{9L}{8}, \ldots 2L, \frac{17L}{8}, \ldots \frac{23L}{8},$$

and the corresponding amplitude values of each of the three constituent waves at the same 8 sample points, where $$s_1(t)=g_1 \sin(0.333\pi t+p_1\pi), s_3(t)=g_3 \sin \pi t \text{ and}$$

$$s_5(t)=g_5 \sin(1.667\pi t+p_5\pi), \text{ and } s(t)=s_1(t)+s_3(t)+s_5(t).$$

The advantage of introducing phase shifts $p_1$ and $p_5$ into the constituent waves is that the data transmission rate can be increased to D=7/3L bps without changing the number of constituent waves (W=3).

TABLE 2.1

FIRST SYMBOL CONSTRAINT:  
$C_1 = 200$ mV, $C_2 = -320$ mV, $C_3 = 280$ mV  
variables: $g_1 = -35.28$ mV, $g_3 = 266.67$ mV,  
$g_5 = 35.28$ mV, $p_1 = 0.2272$, $p_5 = 0.7728$

| t/L | s(t) | $s_{1.8}(t)$ | $s_2(t)$ | $s_{2.2}(t)$ |
|---|---|---|---|---|
| 0.000 | 0.0 | −23.1 | 0.0 | 23.1 |
| 0.125 | 77.8 | −26.4 | 102.1 | 2.1 |
| 0.250 | 139.6 | −29.2 | 188.6 | −19.8 |
| 0.375 | 181.3 | −31.5 | 246.4 | −33.5 |
| 0.500 | 200.0 | −33.3 | 266.7 | −33.3 |
| 0.625 | 192.4 | −34.6 | 246.4 | −19.4 |
| 0.750 | 155.9 | −35.2 | 188.6 | 2.5 |
| 0.875 | 90.3 | −35.2 | 102.1 | 23.4 |
| 1.000 | 0.0 | −34.6 | 0.0 | 34.6 |
| 1.125 | −104.0 | −33.5 | −102.1 | 31.5 |
| 1.250 | −204.9 | −31.7 | −188.6 | 15.4 |
| 1.375 | −282.9 | −29.5 | −246.4 | −7.1 |
| 1.500 | −320.0 | −26.7 | −266.7 | −26.7 |
| 1.625 | −305.0 | −23.4 | −246.4 | −35.2 |
| 1.750 | −237.6 | −19.8 | −188.6 | −29.2 |
| 1.875 | −129.0 | −15.8 | −102.1 | −11.1 |
| 2.000 | 0.0 | −11.5 | 0.0 | 11.5 |
| 2.125 | 124.4 | −7.1 | 102.1 | 29.5 |
| 2.250 | 221.2 | −2.5 | 188.6 | 35.2 |
| 2.375 | 274.8 | 2.1 | 246.4 | 26.4 |
| 2.500 | 280.0 | 6.7 | 266.7 | 6.7 |
| 2.625 | 241.7 | 11.1 | 246.4 | −15.8 |
| 2.750 | 172.2 | 15.4 | 188.6 | −31.7 |
| 2.875 | 86.9 | 19.4 | 102.1 | −34.6 |

TABLE 2.2

SECOND SYMBOL CONSTRAINT:  
$C_1 = -160$ mV, $C_2 = 360$ mV, $C_3 = 240$ mV  
variables: $g_1 = 58.12$ mV, $g_3 = -253.33$ mV,  
$g_5 = -58.12$ mV, $p_1 = 0.1301$, $p_5 = 0.8699$

| t/L | s(t) | $s_1(t)$ | $s_3(t)$ | $s_5(t)$ |
|---|---|---|---|---|
| 0.000 | 0.0 | 23.1 | 0.0 | −23.1 |
| 0.125 | −52.9 | 29.9 | −96.9 | 14.1 |
| 0.250 | −97.5 | 36.1 | −179.1 | 45.5 |
| 0.375 | −134.2 | 41.8 | −234.0 | 58.1 |
| 0.500 | −160.0 | 46.7 | −253.3 | 46.7 |
| 0.625 | −167.3 | 50.8 | −234.0 | 15.9 |
| 0.750 | −146.5 | 54.0 | −179.1 | −21.4 |
| 0.875 | −90.4 | 56.4 | −96.9 | −49.9 |
| 1.000 | 0.0 | 57.7 | 0.0 | −57.7 |
| 1.125 | 113.3 | 58.1 | 96.9 | −41.8 |
| 1.250 | 228.1 | 57.5 | 179.1 | −8.5 |
| 1.375 | 318.2 | 55.9 | 234.0 | 28.2 |
| 1.500 | 360.0 | 53.3 | 253.3 | 53.3 |
| 1.625 | 340.3 | 49.9 | 234.0 | 56.4 |
| 1.750 | 260.8 | 45.5 | 179.1 | 36.1 |
| 1.875 | 138.3 | 40.4 | 96.9 | 0.9 |
| 2.000 | 0.0 | 34.6 | 0.0 | −34.6 |
| 2.125 | −124.6 | 28.2 | −96.9 | −55.9 |
| 2.250 | −211.8 | 21.4 | −179.1 | −54.0 |
| 2.375 | −249.8 | 14.1 | −234.0 | −29.9 |
| 2.500 | −240.0 | 6.7 | −253.3 | 6.7 |
| 2.625 | −194.5 | −0.9 | −234.0 | 40.4 |
| 2.750 | −130.1 | −8.5 | −179.1 | 57.5 |
| 2.875 | −62.1 | −15.9 | −96.9 | 50.8 |

The manner in which the gains are calculated for each of the five constituent waves of the symbol waveform s(t) will now be explained in conjunction with FIG. 6. In this example, one symbol spans three cells (K=3) and the interference pattern is formed from five waves having the respective frequencies $f_1$, $f_2$, $f_3$, $f_4$, $f_5$ and the five waves being in-phase t=0.

Since the amplitude of the symbol waveform s(t) at the symbol boundaries is substantially zero, one equation, s(3L) =0, can be derived from equation (2):

$$s(3L)=0=g_1 \sin \pi + g_2 \sin 2\pi + g_3 \sin 3\pi + g_4 \sin 4\pi + g_5 \sin 5\pi. \quad (17)$$

Additionally, six other equations can be derived by arbitrarily constraining the amplitude of the analog waveform s(t) to $C_1$ mV at t=0.25L, $C_1$ mV at t=0.75L, $C_2$ mV at t=1.25L, $C_2$ mV at t=1.75L, $C_3$ mV at t=2.25L, and $C_3$ mV at t=2.75L:

$$s(0.25L)=C_1=g_1 \sin 0.0833\pi + g_2 \sin 0.1667\pi + g_3 \sin 0.25\pi + g_4 \sin 0.333\pi + g_5 \sin 0.4167\pi \quad (18)$$

$$s(0.75L)=C_1=g_1 \sin 0.25\pi + g_2 \sin 0.5\pi + g_3 \sin 0.75\pi + g_4 \sin \pi + g_5 \sin 1.25\pi \quad (19)$$

$$s(1.25L)=C_2=g_1 \sin 0.4167\pi + g_2 \sin 0.8333\pi + g_3 \sin 1.25\pi + g_4 \sin 1.6667\pi + g_5 \sin 2.0833\pi \quad (20)$$

$$s(1.75L)=C_2=g_1 \sin 0.5833\pi + g_2 \sin 1.1667\pi + g_3 \sin 1.75\pi + g_4 \sin 2.333\pi + g_5 \sin 2.9167\pi \quad (21)$$

$$s(2.25L)=C_3=g_1 \sin 0.75\pi + g_2 \sin 1.5\pi + g_3 \sin 2.25\pi + g_4 \sin 3\pi + g_5 \sin 3.75\pi \quad (22)$$

$$s(2.75L)=C_3=g_1 \sin 0.9167\pi + g_2 \sin 1.8333\pi + g_3 \sin 2.75\pi + g_4 \sin 3.6667\pi + g_5 \sin 4.5833\pi \quad (23).$$

Contrary to the aforementioned examples, the amplitude of the symbol waveform s(t) at the interior cell boundaries are not constrained to zero and are not necessarily at the zero voltage level. However, some advantages are created by this choice, for example, the shape of the AC analog waveform can be more precisely controlled and two readings of $C_1$, $C_2$ and $C_3$ can be provided to reduce the effects of noise. An example describing a technique for increasing the number M of symbols by controlling, i.e., tilting, the waveform shape within each cell is described later.

Since each component of equation (17) defining s(3L) is equal to zero, equation (17) cannot be used to solve for the five wave variables, $g_1$–$g_5$. However, the number of equations can be further reduced to I=5 independent linear equations and the five wave variables can be derived by combining the remaining equations in various manners. For example, subtracting s(2.25L) from s(0.75L) leads to the following solution, $g_2=(C_1-C_3)/2$ and subtracting s(1.75L) from s(1.25L) leads to the following equality, $g_4=0.5774g_2$. The remaining solutions for $g_1$, $g_3$ and $g_5$ can be derived by adding s(0.25L) to s(2.75L), adding s(0.75L) to s(2.25L) and adding s(1.25L) to s(1.75L):

$$g_5 = \frac{(.5C_1 + C_2 + .5C_3)}{5.7952},$$

$$g_1 = 3.732 g_5,$$

$$g_3 = \frac{(C_3 + g_2 - 1.9318 g_5)}{.7071}.$$

As a numerical example, if the same seven possible values for $C_1$, $C_2$ and $C_3$ are selected, namely 54 mV, 66 mV, 78 mV, 90 mV, 102 mV, 114 mV and 126 mV, then M=7*7*7= 343 unique interference patterns can be generated with each of the 343 interference patterns representing a unique symbol. From the expression $N \leq \log_2 M$, the maximum number of data bits that can be encoded per symbol is N=8, thus leaving $E=M-2^N=87$ symbols as extra symbols. FIG. 6 illustrates an actual A/D sampling of the received analog waveform, including its systematic transmission effects. Here, where L=10/9 μsec and D=2.4 Mbps. Although the number of possible values for $C_1$, $C_2$ and $C_3$ is shown to be equal to seven in this example, it is appreciated that the number of possible values may differ for $C_1$, $C_2$ and $C_3$.

Figure 6:
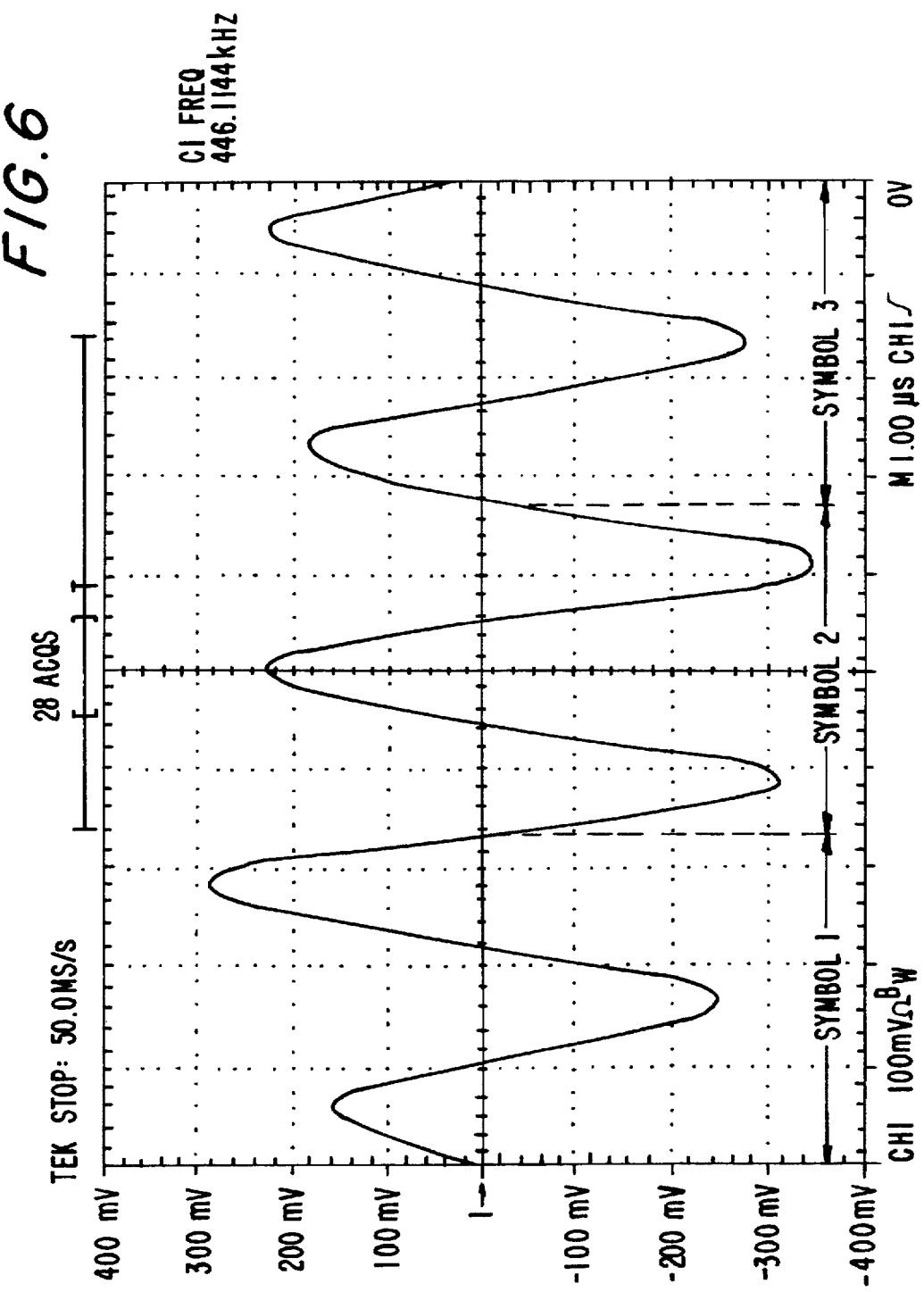
FIG. 6 is an actual A/D sampling of the symbol waveforms s(t) generated and transmitted by still another embodiment of the present invention.

In FIG. 6, the symbol waveforms representing three successive symbols are seamed together to form the analog waveform where $C_1$=54 mV, $C_2$=−90 mV and $C_3$=102 mV for the first symbol, $C_1$=−114 mV, $C_2$=78 mV and $C_3$=−126 mV for the second symbol, and $C_1$=66 mV, $C_2$=−102 mV and $C_3$=78 mV for the third symbol.

As another example, an arbitrarily chosen dependent in-phase wave having frequency f (where $f_6$=1/L Hz) is added to the five constituent waves of the previous example. The addition of this dependent $f_6$ wave alters the aforementioned seven equations (10)–(16) in the following manner because sin $(6(0.25L)\pi/3L)$=1 and sin $(6(0.75L)\pi/3L)$=−1 and so forth:

$$s(0.25L)=C_1+g_6 \quad (24)$$

$$s(0.75L)=C_1-g_6 \quad (25)$$

$$s(1.25L)=C_2+g_6 \quad (26)$$

$$s(1.75L)=C_2-g_6 \quad (27)$$

$$s(2.25L)=C_3+g_6 \quad (28)$$

$$s(2.75L)=C_3-g_6 \quad (29)$$

$$s(3L)=0+g_6 \sin 6\pi. \quad (30)$$

As required, s(3L) still equals zero to avoid discontinuities when successive symbols are seamed. Seven equations (24)–(29) adds either +$g_6$ or −$g_6$ to equation (18)–(23), any arbitrary value may be assigned to $g_6$, as a degree of freedom. In this example, there are I=5 independent equations and six wave variables, i.e., $g_1$–$g_6$.

Figure 7:
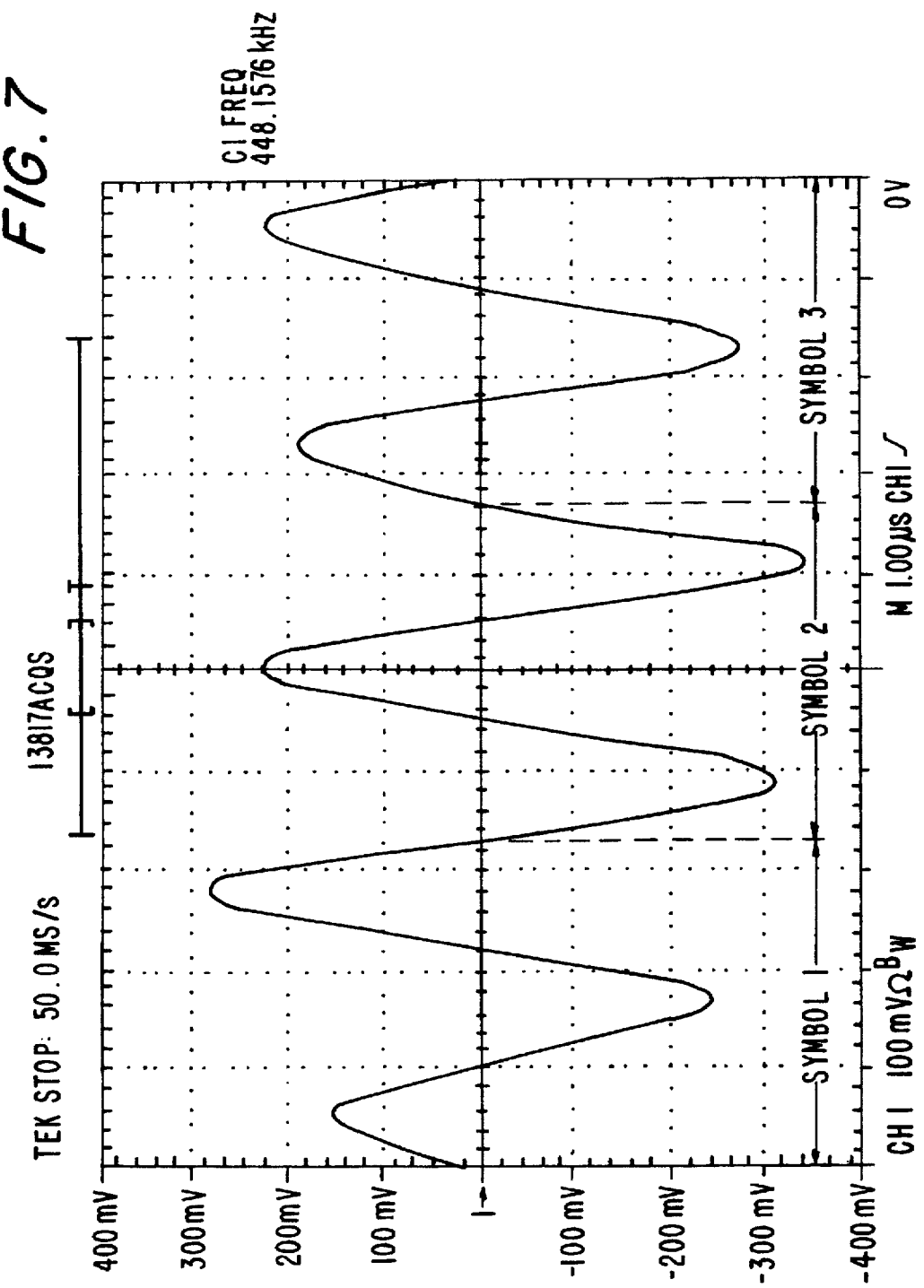
FIG. 7 is an actual A/D sampling of the symbol waveforms s(t) generated and transmitted by still yet another embodiment of the present invention.

Selecting the same seven possible amplitude levels for $C_1$, $C_2$ and $C_3$ as in the previous example, the number of unique interference patterns that can represent symbols can be increased in this example with the addition of the dependent in-phase $f_6$ wave. FIG. 7 is the received analog waveform representing the same three symbols as in FIG. 6, except the dependent $f_6$ wave having $g_6$=6 mV (a shape tilt) is used to generate the symbol waveform s(t) representing the first symbol, the dependent $f_6$ wave having $g_6$=0 mV (no tilt) is used to generate the symbol waveform s(t) representing the second symbol and the dependent $f_6$ wave having $g_6$=−6 mV (opposite shape tilt) is used to generate the symbol waveform s(t) representing the third symbol. The three dependent settings for $g_6$ in this example, +6 mV, 0 mV and −6 mV, triples the number of M symbols such that now M=3*343= 1029 unique symbols, N=10 bits per symbol and B=5 symbols. Tilting the symbol waveform s(t) with the dependent wave advantageously increases the number of encoded bits per symbol from 8 to 10. Thus, the data rate has been increased from D=2.4 Mbps as in the previous example to D=3 Mbps.

It is appreciated that the number of arbitrarily chosen dependent waves that can be added is not limited to one, but any practical number greater than or equal to one can be added so long as the symbol boundary conditions are met, the number of independent equations is not increased and the detector is able to recognize the additional interference patterns. For example, if another dependent in-phase wave having frequency $f_9$ is added to the aforementioned example, the number of unique symbols can be further increased.

In wire line transmission applications, where some links must propagate signals (waveforms) for longer distances than others, it would be advantageous to generate a full set of symbols for shorter links, i.e., use a maximum number of dependent waves and use a reduced set of symbols for longer links, i.e., use fewer or zero dependent waves. Also, the system may dynamically adjust the value of M (the number of unique symbols) in response to the condition of the transmission channel, i.e., use the reduced set of symbols for a noisy channel and the full set of symbols for a "clean" channel. For example, the data (transmission) rate may be initially set to the highest error-free rate and lowered when the error count exceeds a predetermined threshold, i.e., the data rate can be lowered by setting $g_9$ to zero and further lowered by setting both $g_9$ and $g_6$ to zero. It is appreciated that the system may dynamically adjust the value of M in response to other conditions, such as an overload detector.

In narrow band applications, the additional dependent waves can be used to reduce the amplitude requirements of W sinusoidal waves to create an unique interference pattern.

Although five examples have been described hereinabove, it is appreciated that other, different parameter selections can be considered depending upon the particular application of the present invention. Each choice of a parameter has its advantages and disadvantages. For example, a lower cell span K permits fewer symbols (M) to be represented and fewer data bits per symbol (N); but also requires less time to generate each symbol. The resulting analog waveform contains more seams, i.e., more symbol boundaries.

In aggressively narrow frequency band applications, for example, a cell span of K=5, the amplitude of the symbol waveform s(t) at the center of two exterior cells (first and fifth cells) of each symbol can be constrained to one predetermined voltage level, such as the average amplitude, but the three interior cells (second, third and fourth cells) of each symbol may have a total of M combinations of constrained amplitudes. In other words, the data bits are coded into only the three interior cells of each symbol and the exterior cells (first and fifth cells) contain no coded data and may be treated as overhead.

The non-coding of the exterior cells enables a detector to recognize individual symbols easier and minimizes the narrow bandpass filter memory effects by partially decoupling the sequence of symbols. Alternatively, the non-coding overhead can be avoided by spreading the filter cutoffs until the narrow bandpass filter memory effects are minimized.

Figure 8:
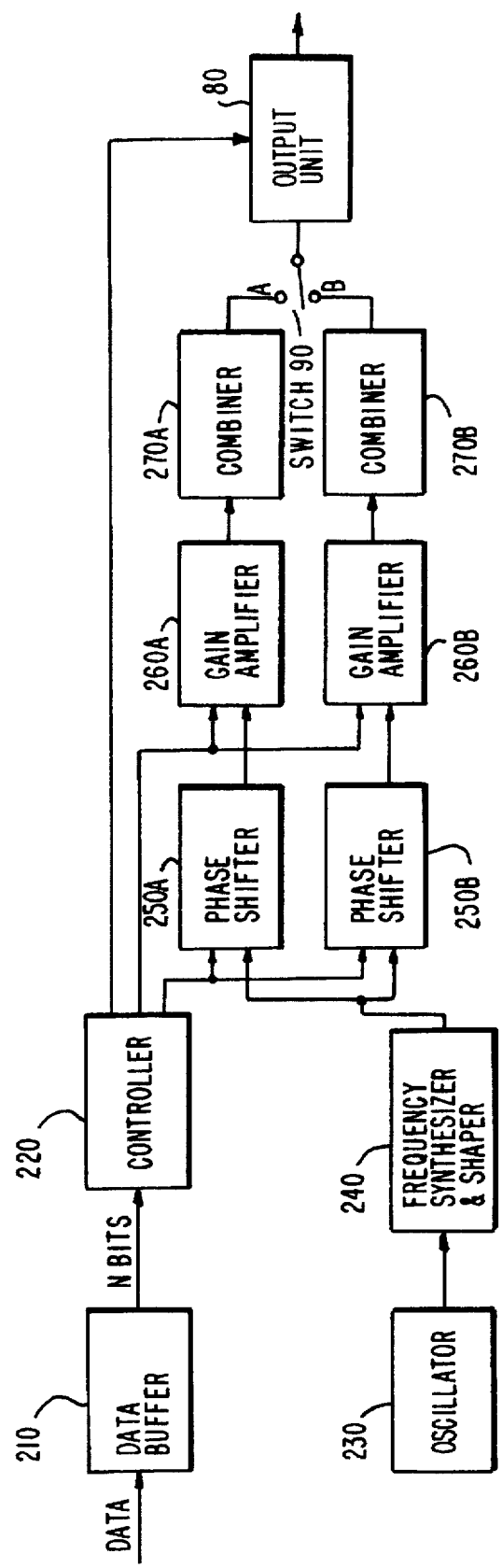
FIG. 8 is a block diagram illustrating an embodiment of the encoding apparatus of the present invention.

Turning now to FIG. 8, there is illustrated a block diagram of one embodiment of the encoding apparatus of the present invention. The encoding apparatus of FIG. 8 is preferably implemented as an integrated circuit and is comprised of a data buffer 210, a controller 220, a local oscillator 230, a frequency synthesizer and shaper 240, phase shifters 250A and 250B, gain amplifiers 260A and 260B, and combiners 270A and 270B.

The wave variables $g_x$ and $p_x$ for each of the constituent waves, manner discussed above, are stored in the gate logic of controller 220. The oscillator 230 generates a clock signal, which is supplied to the frequency synthesizer and shaper 240 for generating a predetermined number W (W>1) of the aforementioned substantially pure sinusoidal waves of selected frequencies. These W waves (W is an integer) are coupled alternately to the phase shifters 250A and 250B. It is appreciated that a set of W waves of different frequencies is generated with the lowest frequency wave being thought of as the first wave in the set (wave labeled as $g_{0.5}$ sin (0.5t$\pi$) in FIG. 3), the highest frequency wave being thought of as the last wave in the set (wave labeled as $g_{1.6}$ sin (1.6t$\pi$) in FIG. 3), and the center wave in the set exhibiting an in-between frequency (wave labeled as $g_{0.9}$ sin (0.9t$\pi$) in FIG. 3).

In some cases, a single reference wave may be generated, from which the remaining constituent waves may be synthesized by appropriate frequency division and frequency multiplication. Alternatively, it may be more convenient to generate W waves using W separate frequency synthesizers and shapers.

Input data, such as the serialized bits of digital information, is supplied to the data buffer 210 which divides the input data into data segments of N-bits wherein N represents an integer greater than or equal to one. Successive data segments are supplied to the controller 220 which generates, as a function of the N-bit data segment, a predetermined number of phase shifts ($p_x$'s) and a predetermined number of gains ($g_x$'s). A respective phase shift $p_x$ and a respective gain $g_x$ correspond to each wave generated by the frequency synthesizer and shaper 240. The phase shifts are supplied alternately to the phase shifters 250A and 250B, and the gains are supplied alternately to the gain amplifiers 260A and 260B.

The phase shifters 250A and 250B control the phase of each wave received from the frequency synthesizer and shaper 240 in accordance with the corresponding phase shift ($p_x$) received from the controller 220. The phase controlled waves are then supplied from the phase shifters to the gain amplifiers 260A and 260B, respectively. Each gain amplifier is uniquely associated with a particular phase shifter.

The gain amplifiers 260A and 260B control the amplitude of each phase controlled wave received from the respective phase shifters 250A and 250B in accordance with the corresponding gain ($g_x$) supplied thereto from the controller 220. The gain and phase controlled waves are then coupled to the combiners 270A and 270B, and each combiner is uniquely associated with a particular gain amplifier.

Each of the combiners 270A and 270B combines W gain- and phase-controlled waves to create an interference pattern that is formed as a symbol waveform s(t) representing a unique symbol, such as shown in FIG. 3. In other words, N-bits of data are encoded as a unique interference pattern, or symbol, depending upon the value of those N-bits. Each combiner may comprise a digital signal processor to enhance the processing of the combined waves. The symbol waveform s(t) is then supplied to the output unit 80 for transmission. The output unit 80 seamlessly combines the symbol waveforms s(t) representing successive N-bit data segments to create a single AC analog waveform for transmission. It is recalled that this advantageously results because of the symbol boundary condition, i.e., zero voltage level.

Pairs of phase shifters, gain amplifiers, and combiners enable the apparatus to prepare the next N-bit data segment while transmitting the current data segment. For example, the circuits of what may be thought of as channel A may function to transmit the current data segment while the circuits of channel B function to prepare the next data segment. A switch 90 connects the output unit 80 either to combiner 270A or 270B depending upon which combiner is processing the current data segment. It will be appreciated that the number of channels of phase shifters, gain amplifiers, and combiners is not limited to two and can be any practical number greater than two as long as these additions improve the symbol set upon implementation by allowing additional symbol set-up time.

Figure 9:
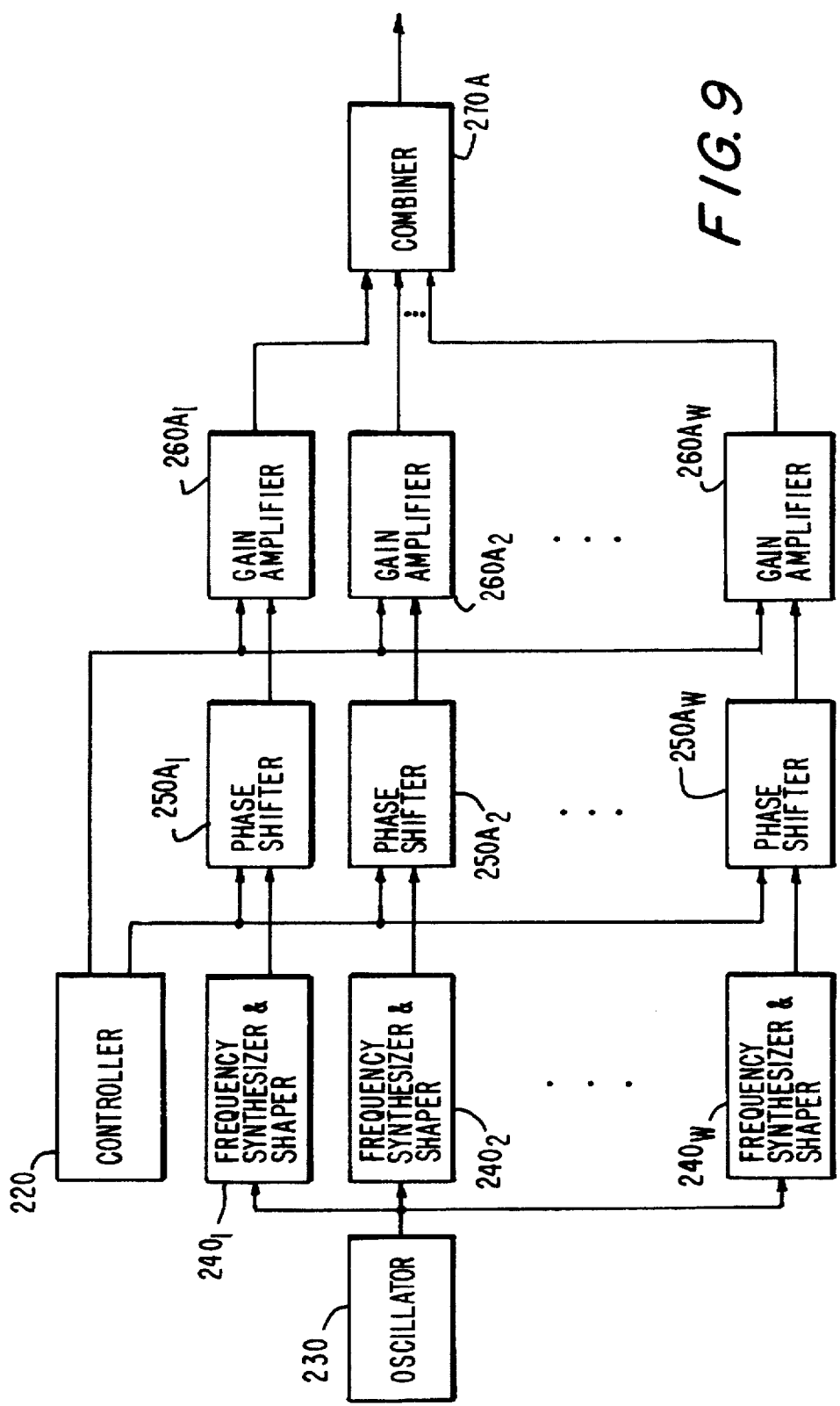
FIG. 9 is a block diagram illustrating another embodiment of the encoding apparatus of the present invention.

Referring to FIG. 9, there is shown a block diagram of one section of the encoding apparatus of FIG. 8. Each section comprises W phase shifters $250A_1$–$250A_W$ and corresponding W gain amplifiers $260A_1$–$260A_W$. The oscillator 230 supplies the clock signal to each of the W frequency synthesizer and shapers $240_1$–$240_W$. Each frequency synthesizer and shaper generates one of the W waves (see FIGS. 3–7) to be superimposed to create the symbol waveform s(t); i.e., the frequency synthesizer and shaper 240; generates the wave x out of W, which is supplied to the phase shifter $250A_x$ (see FIG. 3).

Each one of the W phase shifters $250A_1$–$250A_W$ controls the phase of a respective one of the W waves received from the frequency synthesizer and shaper $240_1$–$240_W$ with the corresponding phase shift; i.e., $p_x$ controls the phase of the wave x of the first set of W waves. The W phase controlled waves in the set are then supplied to the gain amplifiers $260_1$–$260_W$. That is, the phase shifter $250A_x$ controls the phase of the wave x with the corresponding phase shift $p_x$ and supplies the phase controlled wave x to the gain amplifier $260A_x$.

Each one of the W gain amplifiers $260A_1$–$260A_W$ controls the gain (amplitude) of a respective one of the W phase controlled waves with the gain corresponding thereto; and the W phase and gain controlled waves in a set are supplied to the combiner 270A. In other words, the gain shifter controls the amplitude of the phase controlled wave x with the corresponding gain $g_x$ and supplies the phase and gain controlled wave x to the combiner 270A.

Turning to FIG. 10, there is illustrated a block diagram of another embodiment of the apparatus for encoding and generating a sequence of symbol waveforms s(t) for transmission. The apparatus is comprised of a data buffer 110, an address generator 120, an electronic memory table 130, a D/A converter 140, a low pass filter 150 and an output unit 80.

Input data, such as serialized bits of digital information, is supplied to the data buffer 110 which divides the input data into data segments of N-bits wherein N represents an integer greater than or equal to one. Successive N-bit data segments are read from the data buffer 110 by the address generator 120. The address generator 120 generates a code or address, corresponding to each N-bit data segment to uniquely identify a previously recorded (stored) symbol waveform s(t) out of the possible M previously recorded symbol waveforms s(t). The address is supplied to the table 130.

Table 130 has electronically stored therein the sample digital output values (levels) associated with each of the M unique symbol waveforms s(t) in a respective table. For example, there are M addressable tables to record the sample amplitude levels for each of the M symbol waveforms s(t). In one embodiment, these sample amplitude levels were previously obtained by sampling each of the M unique symbol waveforms at P equally spaced intervals per cell. The table 130 uses the address received from the address generator 120 to uniquely address (identify) a respective table from which the sequence of output values representing the symbol waveform s(t) is supplied to the D/A converter 140.

For example, tables 3.1 and 3.2 show these actual digital output values for 2 symbols out of the possible M=216 symbols as depicted in FIG. 5, where P=8 samples per cell and K=3 cells per symbol as a sequence of twenty-four digital output values per symbol. FIGS. 2 and 4–7 represent the symbol waveforms s(t) actually generated and transmitted by the encoding apparatus of FIG. 10 using D/A converter 140 with 12 bit output resolution, i.e., there are 4096 distinct output levels available. In FIG. 5, the digital output value 2047 was set at the DC reference 0 volts. The digital output values 0 and 4094 were adjusted to −400 mV and 400 mV, respectively, as a full scale. The twenty-four samples of the symbol waveform s(t) were recorded in table 130 as the nearest D/A output voltage level. FIG. 5 shows two symbol waveforms s(t) seamed together to form an AC analog waveform; the first and second symbol waveforms were generated using tables 3.1 and 3.2, respectively. That is the output sequence 1-24 in table 3.1 was used to generate the first symbol waveform s(t) in FIG. 5 and the output sequence 25-48 was used to generate the second symbol waveform s(t) in FIG. 5.

TABLE 3.1

| Sequence # | s(t) | D/A output levels |
| --- | --- | --- |
| 1 | 0.0 | 2047 |
| 2 | 77.8 | 2445 |
| 3 | 139.6 | 2761 |
| 4 | 181.3 | 2975 |
| 5 | 200.0 | 3070 |
| 6 | 192.4 | 3032 |
| 7 | 155.9 | 2845 |
| 8 | 90.3 | 2509 |
| 9 | 0.0 | 2047 |
| 10 | −104.0 | 1515 |
| 11 | −204.9 | 998 |
| 12 | −282.9 | 599 |
| 13 | −320.0 | 409 |
| 14 | −305.0 | 486 |
| 15 | −237.6 | 831 |
| 16 | −129.0 | 1387 |
| 17 | 0.0 | 2047 |
| 18 | 124.4 | 2684 |
| 19 | 221.2 | 3179 |
| 20 | 274.8 | 3454 |
| 21 | 280.0 | 3480 |
| 22 | 241.7 | 3284 |
| 23 | 172.2 | 2928 |
| 24 | 86.9 | 2492 |

TABLE 3.2

| Sequence # | s(t) | D/A output levels |
| --- | --- | --- |
| 25 | 0.0 | 2047 |
| 26 | −52.9 | 1776 |
| 27 | −97.5 | 1548 |
| 28 | −134.2 | 1360 |
| 29 | −160.0 | 1228 |
| 30 | −167.3 | 1191 |
| 31 | −146.5 | 1297 |
| 32 | −90.4 | 1584 |
| 33 | 0.0 | 2047 |
| 34 | 113.3 | 2627 |
| 35 | 228.1 | 3214 |
| 36 | 318.2 | 3675 |
| 37 | 360.0 | 3889 |
| 38 | 340.3 | 3788 |
| 39 | 260.8 | 3382 |
| 40 | 138.3 | 2755 |
| 41 | 0.0 | 2047 |
| 42 | −124.6 | 1409 |
| 43 | −211.8 | 963 |
| 44 | −249.8 | 769 |
| 45 | −240.0 | 819 |
| 46 | −194.5 | 1051 |
| 47 | −130.1 | 1381 |
| 48 | −62.1 | 1729 |

The D/A converter 140 holds each received digital output level for L/P seconds and then outputs the next digital output level in the received sequence from table 130. The low pass filter 150 smoothes these D/A output steps into the smooth AC analog waveform, such as in FIGS. 4-7, and supplies the AC analog waveform to the output unit 80 for transmission.

It will be appreciated that the D/A converter produces a compound output wave analogous to that of CD music. In the CD environment, the succession of N=16 bit strings read from the optical disk prescribe the sequence of D/A output levels that generate a smooth analog waveform which is supplied to an audio loudspeaker that generates a complex mix of musical tones that are detected by the listener's ear. Rich recorded music is an interference pattern of a large, but continuously variable number W of superimposed sinusoidal waves. The AC analog waveform s(t) of this invention is much less musically rich as it produces usually a single varying amplitude tone of frequency 1/2L Hz.

It is also appreciated that for a narrow bandwidth application, it may be advantageous to use a D/A converter 140 with higher bit resolution, such as 16 bits, to more precisely shape the resulting analog waveforms. However, this element should not be considered independently in selecting the optimal encoder and decoder. Other factors, such as the smoothness of the symbol seams, the maximum rate of amplitude change of the analog waveform s(t), etc. are to be considered because these factors interact with the operating efficiency of the detector. It is appreciated that this rate of amplitude change is recognized by the detector as other frequencies. Computer modeling and simulation may be used to assist in selecting the optimal parameters to generate the symbol waveform s(t).

Figure 1:
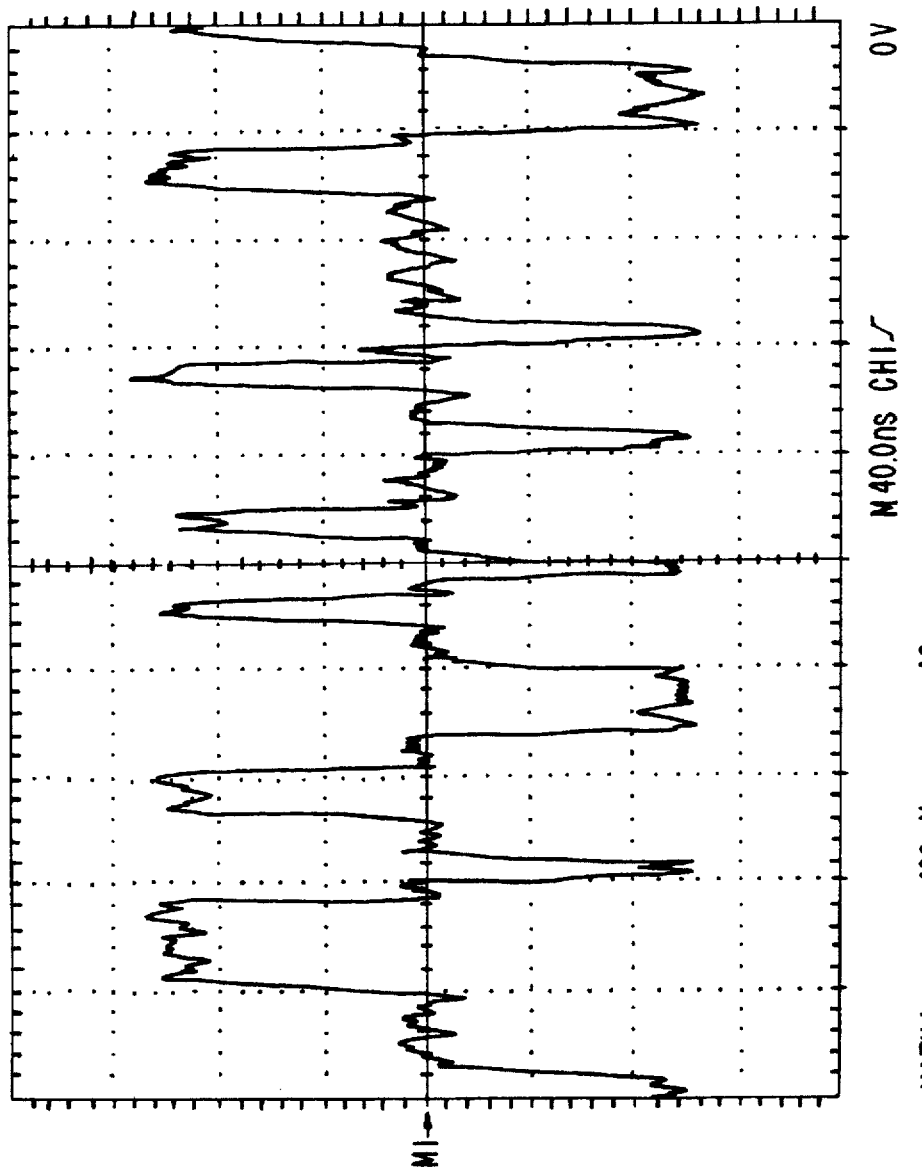
FIG. 1 is an actual A/D sampling of a 100 Mbps Ethernet transmission.

The actual AC analog waveform generated and transmitted by the encoding apparatus of FIG. 10 and sampled by the digital oscilloscope are shown as the received waveforms in FIGS. 4-7. The digital oscilloscope determines (senses) the average frequency of the resulting AC analog waveform based upon the zero crossings of the waveform, which are approximately 500 KHz, 600 KHz, 450 KHz and 450 KHz, respectively, the $f_K$ frequencies of the aforementioned examples. A spectrum analyzer instrument measuring these AC analog waveforms shows a spike at frequency $f_K$, and nowhere else. This spectrum analyzer result supports the non-interference advantage of this invention. In contrast, the PCM waveform in FIG. 1, and all other pulse codes, display many frequencies on a spectrum analyzer. Likewise, a fast Fourier transform (FFT) computation across the AC analog waveform of many seamed symbols of this invention, typically only shows frequency component $f_K$ above the noise. The W constituent frequencies are averaged to near zero power across many seamed symbols.

Turning to FIG. 11, there is illustrated a block diagram of apparatus for detecting and decoding N bits of data from a smooth analog waveform. The detecting apparatus is preferably implemented as a custom integrated circuit and is comprised of a bandpass filter 310, an A/D sampler data buffer 320, a signal processor 330 and a decoder/memory 340.

The input AC analog waveform with the symbols (interference patterns) seamed together as depicted in FIGS. 3-7 is supplied to the bandpass filter 310 which filters out the undesirable frequency range, i.e., frequencies sufficiently outside of the range of the W waves used to create the AC analog waveform. The AC analog waveform within the pass band is then supplied to the A/D sampler data buffer 320 which samples the filtered AC analog waveform at predetermined spaced intervals. This sampled waveform contains systematic transmission effects, which alters the generated waveform. The A/D sampler data buffer 320 preferably includes an internal clock for generating sampling pulses at these predetermined spaced intervals; and the sampled values (or voltage readings) are supplied to the signal processor 330. It is appreciated that a greater number of samples allows for more precise signal processing, but this, in turn, requires a faster and more expensive signal processor. The signal processor 330 must take into account the systematic transmission effects, including the effects of the bandpass filter 310 and the low pass filter 150 in FIG. 10.

With a short cell duration L, the signal processor may be implemented with analog comparison circuitry, but for longer cell durations, a digital signal processor (DSP) utilizing conventional processing techniques and combinations hereof, such as integration, differentiation, threshold detection, and general pattern recognition, is preferable. With a programmable DSP, microcode improvements and updates may be readily implemented to overcome potential detector performance problems that were not previously considered or apparent in selecting (designing) the detector.

The signal processor 330 utilizing conventional processing techniques, processes the samples to determine the sequence of constrained output levels from $C_1$, $C_2$, $C_3$ and so forth used in generating the AC analog waveform stored in decoder/memory 340 (analogous to the sequence of output levels stored in the Table 130 in FIG. 10, i.e. Tables 3.1 and 3.2). The function of the signal processor 330 is to correctly recognize the sequence of symbols making up the transmitted AC analog waveform. The recognized sequence of output levels is supplied to the decoder/memory 340.

The decoder/memory 340 decodes a recognized sequence of symbols received from the signal processor 330. If the received symbol is a data symbol, the decoder/memory 340 recovers the N-bits of data therefrom. On the other hand, if the received symbols corresponds to an extra symbol x, control action that may be represented by such extra symbol x is recovered. Some extra symbols may be used to control synchronization, addressing protocol, error detection, scrambling and compaction, among others.

The integrated circuits (ICs) of the generating and detecting apparatus of this invention are a matched pair of IC chips that contain the results of the design process. Alternatively, the generating and detecting apparatus may be constructed as conventional microprocessors, preferably high-speed microprocessors.

Thus far, only examples of direct propagation have been described. In another application of the present invention, the above-mentioned encoding and decoding apparatuses may be incorporated into an optical transmission system, such as a fiber optic system, a laser communication system, or the like. In such application, the output unit 80 (FIGS. 8 and 10) supplies the AC analog waveform representing a symbol to an optical intensity modulator which modulates the photon output of a light wave.

As yet another application of this invention, the encoding apparatus may be incorporated into an RF transmitter so that the AC analog waveform modulates a carrier wave resulting in an AM modulated waveform. The RF carrier frequency thus modulated is assumed to be significantly higher than the frequency $f_K$. It is recognized that the symbol waveform, that is, the AC analog waveform representing a sequence of symbols, amplitude modulates the RF carrier frequency.

As a further application of this invention, the encoding apparatus may be incorporated into a magnetic storage device, wherein the AC analog waveform from the output unit 80 (FIGS. 8 and 10) is used to modulate the write current of a recording head so as to induce flux changes in the magnetic media of a magnetic recorder. The read head of the magnetic storage device provides the analog waveform input to the bandpass filter 310 of the decoder (FIG. 11).

In still another application of this invention, the encoder and decoder are provided at each end of a two-way transmission system. The two-way transmission system may operate with a single channel by utilizing reverse signalling. Two-way systems may also operate with separate channels, with a respective channel being assigned to a particular transmission direction.

In yet another application of this invention, the encoder and the decoder are incorporated into a regenerative repeater. The AC analog waveform s(t) received by the repeater is decoded into data by the decoder; and the encoder re-encodes that decoded data into another AC analog waveform s'(t) that is re-transmitted. It is appreciated that the repeater may encode the data differently from the form in which it is received to provide added security, i.e., different embodiments of the encoder are incorporated into the transmitter and the repeater, respectively. In other words, the analog waveform generated by the repeater s'(t) may differ from the received analog waveform s(t).

While the present invention has been particularly shown and described with reference to preferred embodiments, it will be readily appreciated that various changes may be made without departing from the spirit and scope of the invention. It is intended that the appended claims be interpreted to include the embodiments discussed above, those alternatives which have been described and all equivalents thereto.

What is claimed is:

1. A method of encoding input data into a single analog waveform formed as a unique interference pattern, comprising the steps of:

receiving said input data, wherein said input data are formed of serial bits of digital information generating a plurality of substantially sinusoidal waves, each of which exhibits at least one controllable wave characteristic;

dividing said input data into segments of N-bits of data, where N is an integer greater than or equal to one;

controlling said at least one wave characteristic of respective ones of said plurality of waves as a function of a segment of said N-bits of data to produce controlled waves;

combining a plurality of said controlled waves to create an interference pattern; and outputting said interference pattern as said single analog waveform representing said input data.

2. The method of claim 1, wherein a segment is encoded as a symbol; said single analog waveform represents successive symbols; and said single analog waveform is continuous from symbol to symbol.

3. The method of claim 2, wherein said single analog waveform exhibit a substantially zero amplitude at a boundary between successive symbols.

4. The method of claim 2, wherein said single analog waveform is an AC analog waveform.

5. The method of claim 4, wherein said AC analog waveform spans a duration of K cells to represent a symbol.

6. The method of claim 5, wherein each symbol of K cells represents a predetermined time duration KL seconds and wherein said AC analog waveform has an average frequency $f_K=1/2L$.

7. The method of claim 6, where the frequency of at least one of said plurality of substantially sinusoidal waves is greater than $f_K$ and the frequency of at least one of said plurality of substantially sinusoidal waves is less than $f_K$.

8. A method of encoding input data into a single analog waveform formed as a unique interference pattern, comprising the steps of:

receiving said input data;

generating a plurality of substantially sinusoidal waves, each of which exhibits at least one controllable wave characteristic;

controlling at least gain of respective ones of said plurality of waves as a function of said input data to produce controlled waves;

combining a plurality of said controlled waves to create an interference pattern; and outputting said interference pattern as said single analog waveform representing said input data.

9. The method of claim 8, wherein the step of controlling further controls phase of said respective ones of said plurality of waves as a function of said input data to produce controlled waves.

10. The method of claim 5, further comprising the step of shaping said AC analog waveform by constraining the amplitude of said AC analog waveform to at least one constraining value at at least one predetermined point within each cell.

11. The method of claim 10, wherein said at least one constraining value corresponds to a plurality of discrete voltage levels.

12. An apparatus for encoding input data into a single analog waveform formed as a unique interference pattern, comprising:

means for receiving said input data, wherein said input data are formed of serial bits of digital information;

means for dividing said input data into segments of N-bits of data, where N is an integer greater than or equal to one;

means for generating a plurality of substantially sinusoidal waves, each of which exhibits at least one controllable wave characteristic;

means for controlling said at least one wave characteristic of respective ones of said plurality of waves as a function of a segment of said N-bits of data to produce controlled waves;

means for combining a plurality of said controlled waves to create an interference pattern; and means for outputting said interference pattern as said single analog waveform representing said input data.

13. The apparatus of claim 12, wherein a segment is encoded as a symbol; said single analog waveform represents successive symbols; and said single analog waveform is continuous from symbol to symbol.

14. The apparatus of claim 13, wherein said single analog waveform exhibit a substantially zero amplitude at a boundary between successive symbols.

15. The apparatus of claim 13, wherein said single analog waveform is an AC analog waveform.

16. The apparatus of claim 15, wherein said AC analog waveform spans a duration of K cells to represent a symbol.

17. The apparatus of claim 16, wherein each symbol of K cells represents a predetermined time duration KL seconds and wherein said AC analog waveform has an average frequency $f_K = 1/2L$.

18. The apparatus of claim 17, where the frequency of at least one of said plurality of substantially sinusoidal waves is greater than $f_K$ and the frequency of at least one of said plurality of substantially sinusoidal waves is less than $f_K$.

19. An apparatus for encoding input data into a single analog waveform formed as a unique interference pattern, comprising:

means for receiving said input data;

means for generating a plurality of substantially sinusoidal waves, each of which exhibits at least one controllable wave characteristic;

means for controlling at least gain of respective ones of said plurality of waves as a function of said input data to produce controlled waves;

means for combining a plurality of said controlled waves to create an interference pattern; and means for outputting said interference pattern as said single analog waveform representing said input data.

20. The apparatus of claim 19, wherein said means for controlling further includes means for controlling phase of said respective ones of said plurality of waves as a function of said input data to produce controlled waves.

21. The apparatus of claim 16, further comprising means for shaping said AC analog waveform by constraining the amplitude of said AC analog waveform to at least one constraining value at least one predetermined point within each cell.

22. The apparatus of claim 21, wherein said at least one constraining value corresponds to one of a plurality of discrete voltage levels.

23. A method of encoding input data into a single analog waveform, comprising the steps of:

forming said input data of serial bits of digital information;

dividing said input data into segments of N-bits of data, where N is an integer greater than or equal to one;

providing addressable tables of stored digital values of sample points of respective symbol waveforms s(t), wherein s(t) is an interference pattern created by combining plural substantially sinusoidal waves, each of said substantially sinusoidal waves having at least one wave characteristic controlled as a function of a segment of said N-bits of data;

generating an address as a function of said input data for addressing a table;

reading the stored digital values from the addressed table; and processing the digital values read from said addressed table to produce said single analog waveform representing said input data.

24. The method of claim 23, wherein a segment is encoded as a symbol waveform s(t); said single analog waveform represents successive symbol waveforms s(t); and said single analog waveform is continuous from symbol waveform s(t) to symbol waveform s(t).

25. The method of claim 24, wherein said single analog waveform exhibit a substantially zero amplitude at a boundary between successive symbol waveforms s(t).

26. The method of claim 24, wherein said single analog waveform is an AC analog waveform.

27. The method of claim 26, wherein said AC analog waveform spans a duration of K cells to represent a symbol waveform s(t).

28. The method of claim 27, wherein each symbol of K cells represents a predetermined time duration KL seconds and wherein said AC analog waveform has an average frequency $f_K = 1/2L$.

29. The method of claim 28, where the frequency of at least one of said plurality of substantially sinusoidal waves is greater than $f_K$ and the frequency of at least one of said plurality of substantially sinusoidal waves is less than $f_K$.

30. A method of encoding input data into a single analog waveform, comprising the steps of:

providing addressable tables of stored digital values of sample points of respective symbol waveforms s(t), wherein s(t) is an interference pattern created by combining plural substantially sinusoidal waves, each of said substantially sinusoidal waves having at least one wave characteristic controlled as a function of said input data;

generating an address as a function of said input data for addressing a table;

reading the stored digital values from the addressed table; and processing the digital values read from said addressed table to produce said single analog waveform representing said input data and wherein said wave characteristic is gain of said respective ones of said plurality of waves controlled as a function of said input data to produce controlled waves.

31. The method of claim 30, wherein the step of controlling further controls phase of said respective ones of said plurality of waves as a function of said input data to produce controlled waves.

32. The method of claim 27, further comprising the step of shaping said AC analog waveform by constraining the amplitude of said AC analog waveform to at least one constraining value at least one predetermined point within each cell.

33. The method of claim 32, wherein each constraining value corresponds to a plurality of discrete voltage levels.

34. An apparatus for encoding input data into a single analog waveform, comprising:

means for forming said input data of serial bits of digital information;

means for dividing said input data into segments of N-bits of data, where N is an integer greater than or equal to one;

means for providing addressable tables of stored digital values of sample points of respective symbol waveforms s(t), wherein s(t) is an interference pattern created by combining plural substantially sinusoidal waves, each of said substantially sinusoidal waves having at least one wave characteristic controlled as a function of a segment of said N-bits of data;

means for generating an address as a function of said input data for addressing a table;

means for reading the stored digital values from the addressed table; and means for processing the digital values read from said addressed table to produce said single analog waveform representing said input data.

35. The apparatus of claim 34, wherein a segment is encoded as a symbol waveform s(t); said single analog waveform represents successive symbol waveforms s(t); and said single analog waveform is continuous from symbol waveform s(t) to symbol waveform s(t).

36. The apparatus of claim 35, wherein said single analog waveform exhibit a substantially zero amplitude at a boundary between successive symbol waveforms s(t).

37. The apparatus of claim 35, wherein said single analog waveform is an AC analog waveform.

38. The apparatus of claim 37, wherein said AC analog waveform spans a duration of K cells to represent a symbol waveform s(t).

39. The apparatus of claim 38, wherein each symbol of K cells represents a predetermined time duration KL seconds and wherein said AC analog waveform has an average frequency $f_K=1/2L$.

40. The apparatus of claim 39, where the frequency of at least one of said plurality of substantially sinusoidal waves is greater than $f_K$ and the frequency of at least one of said plurality of substantially sinusoidal waves is less than $f_K$.

41. An apparatus for encoding input data into a single analog waveform, comprising:

means for providing addressable tables of stored digital values of sample points of respective symbol waveforms s(t), wherein s(t) is an interference pattern created by combining plural substantially sinusoidal waves, each of said substantially sinusoidal waves having at least one wave characteristic controlled as a function of said input data;

means for controlling gain of said respective ones of said plural waves as a function of said input data to produce controlled waves;

means for generating an address as a function of said input data for addressing a table;

means for reading the stored digital values from the addressed table; and means for processing the digital values read from said addressed table to produce said single analog waveform representing said input data.

42. The apparatus of claim 41, wherein said means for controlling further includes means for controlling phase of said respective ones of said plurality of waves as a function of said input data to produce controlled waves.

43. The apparatus of claim 38, further comprising means for shaping said AC analog waveform by constraining the amplitude of said AC analog waveform to at least one constraining value at least one predetermined point within each cell.

44. The apparatus of claim 43, wherein said at least one constraining value corresponds to one of a plurality of discrete voltage levels.

* * * * *

UNITED STATES PATENT AND TRADEMARK OFFICE
CERTIFICATE OF CORRECTION

PATENT NO. : 5,802,112
DATED : September 1, 1998
INVENTOR(S) : Ganter

It is certified that error appears in the above-identified patent and that said Letters Patent is hereby corrected as shown below:

On the title page: Item [73] Assignee: "Transcendat Inc., Boulder, Colo." should read -- Transcendata Inc., Boulder Colo--.

Signed and Sealed this

Sixteenth Day of March, 1999

Q. TODD DICKINSON

Attest:

Attesting Officer

Acting Commissioner of Patents and Trademarks